(12) United States Patent
Matsuda et al.

(10) Patent No.: US 7,270,422 B2
(45) Date of Patent: Sep. 18, 2007

(54) IMAGE PROCESSING SYSTEM, PROJECTOR, PROGRAM, INFORMATION STORAGE MEDIUM, AND IMAGE PROCESSING METHOD

(75) Inventors: Hideki Matsuda, Fujimi-machi (JP); Masanobu Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 365 days.

(21) Appl. No.: 11/082,978

(22) Filed: Mar. 18, 2005

(65) Prior Publication Data

US 2005/0213846 A1   Sep. 29, 2005

(30) Foreign Application Priority Data

Mar. 29, 2004   (JP)   ............... 2004-095938

(51) Int. Cl.
*H04N 3/23*   (2006.01)
*G03B 21/00*   (2006.01)

(52) U.S. Cl. .............. 353/70; 348/746; 382/255; 382/256

(58) Field of Classification Search ............. 353/69, 353/70, 121; 348/745–747; 382/100, 154, 382/174, 255, 256, 285, 289, 291
See application file for complete search history.

(56) References Cited

U.S. PATENT DOCUMENTS

| 6,695,451 B1 | 2/2004 | Yamasaki et al. |
| 6,753,907 B1* | 6/2004 | Sukthankar et al. ..... 348/222.1 |
| 6,808,270 B2* | 10/2004 | Nelson et al. ............... 353/69 |
| 6,846,081 B2 | 1/2005 | Mochizuki et al. |
| 7,167,645 B2* | 1/2007 | Matsuda et al. ............ 396/213 |
| 2003/0058252 A1 | 3/2003 | Matsuda et al. ............ 345/589 |
| 2004/0021799 A1 | 2/2004 | Matsuda ..................... 348/744 |
| 2004/0036813 A1 | 2/2004 | Matsuda ..................... 348/744 |
| 2004/0061838 A1* | 4/2004 | Mochizuki et al. ........... 353/69 |
| 2005/0168705 A1* | 8/2005 | Li et al. ...................... 353/69 |
| 2005/0180655 A1* | 8/2005 | Ohta et al. ................. 382/275 |

FOREIGN PATENT DOCUMENTS

| JP | A 05-030520 | 2/1993 |
| JP | A 2000-149031 | 5/2000 |
| JP | A 2000-241874 | 9/2000 |
| JP | A 2003-108109 | 4/2003 |
| JP | A 2004-048694 | 2/2004 |
| JP | A 2004-048695 | 2/2004 |
| JP | A 2004-260785 | 9/2004 |
| WO | WO99/31877 A1 | 6/1999 |

OTHER PUBLICATIONS

U.S. Appl. No. 11/083,033, filed Mar. 18, 2005, Hideki Matsuda, et al.

* cited by examiner

*Primary Examiner*—W. B. Perkey
*Assistant Examiner*—Andrew T Sever
(74) *Attorney, Agent, or Firm*—Oliff & Berridge, PLC

(57) ABSTRACT

A projector includes an image projection section, a sensor that senses a projected first calibration image at a low resolution and generates first sensing information, senses the first calibration image at a high resolution and generates third sensing information, and senses a second calibration image at a high resolution and generates second sensing information, a projection area detection section that generates projection area information, based on the first and second sensing information, a projection-target area detection section that generates projection-target area information, based on the first, second, and third sensing information, and an image distortion correction section that corrects distortion of an image projected by the image projection section, based on the projection area information and the projection-target area information.

22 Claims, 18 Drawing Sheets

IMAGE PROCESSING SYSTEM, PROJECTOR, PROGRAM, INFORMATION STORAGE MEDIUM, AND IMAGE PROCESSING METHOD

Japanese Patent Application No. 2004-95938, filed on Mar. 29, 2004, is hereby incorporated by reference in its entirety.

BACKGROUND OF THE INVENTION

The present invention relates to an image processing system, a projector, a program, an information storage medium, and an image processing method in which adjustment of a projection image is based on sensing information.

A recent proposal for adjusting details such as the position of a projection image involves projecting an image onto a projection target such as a screen, using a projector provided with a CCD camera, and using the CCD camera to sense the projected projection image to detect the coordinates of four corners of the projection-target area that correspond to the projection target within the sensing area.

For example, Japanese Patent Application Laid-Open No. 5-30520 proposes a configuration in which the position at which an image is projected is adjusted by displaying an image within an image-displayable area and sensing the entire image-displayable area.

However, although this Japanese Patent Application Laid-Open No. 5-30520 does disclose the process of detecting the positions of four corners of the displayable area of the screen by fetching luminance information stored in a frame memory into a CPU for image processing, it does not disclose any specific details of that image processing.

When the positions of the four corners of the screen are detected from sensing information during general-purpose image processing used in the art, it is necessary to subject the entire sensed image to filtering processing, which takes time for the image processing and also greatly increases the amount of calculations.

For that reason, calibration is time-consuming and thus the time during which the user has to wait increases.

To improve the universality of the method, it is necessary to detect the area of the screen, even when the projection image does not include the entire screen.

It is also necessary to project an image that is as large as possible, onto the center of the screen, in order to display an image that is easy for viewers to see.

BRIEF SUMMARY OF THE INVENTION

According to a first aspect of the present invention, there is provided an image processing system which performs image processing based on a difference image, the difference image being a difference image between a first calibration image and a second calibration image and being configured of: a center block area positioned in a central part of the difference image; a peripheral block area positioned on a periphery of the center block area; and a background area which is an area other than the center block area and the peripheral block area, the image processing system comprising:

image projection means for projecting the first and second calibration images at different timings onto a projection target;

sensing means for sensing the projected first calibration image at a low resolution which is less than or equal to a predetermined resolution and generating first sensing information, sensing the first calibration image at a high resolution which is greater than or equal to the low resolution and generating third sensing information, and sensing the second calibration image at the high resolution and generating second sensing information;

projection area detection means for generating projection area information relating to a position of a projection area in a sensing area of the sensing means, based on the first and second sensing information;

projection-target area detection means for generating projection-target area information relating to a position of a projection-target area corresponding to the projection target in the sensing area of the sensing means, based on the first, second, and third sensing information; and image distortion correction means for correcting distortion of an image to be projected by the image projection means, based on the projection area information and the projection-target area information, wherein at least an outer peripheral portion of the second calibration image has a brightness index value of zero, wherein the projection area detection means comprises:

difference image generation means for generating the difference image, based on the first and second sensing information;

center reference position detection means for detecting a plurality of center reference positions of the center block area in the sensing area of the sensing means, based on the difference image;

peripheral reference position detection means for detecting a plurality of peripheral reference positions of the peripheral block area in the sensing area, based on the center reference positions; and projection area information generation means for generating the projection area information, based on the center reference positions and the peripheral reference positions, wherein the projection-target area detection means comprises:

search range determination means for setting a search range for edge detection in an outer portion of the center block area;

edge detection means for performing edge detection based on the first sensing information and the search range and generating first edge detection information, and also performing edge detection based on the third sensing information and generating third edge detection information; and projection-target area information generation means for generating provisional detection information by provisionally detecting the projection-target area based on the first edge detection information, and also generating the projection-target area information based on the third edge detection information, and wherein the edge detection means generates the third edge detection information by performing edge detection on a pixel group around a boundary of the provisionally detected projection-target area, based on the provisional detection information.

According to a second aspect of the present invention, there is provided a projector which performs image processing based on a difference image, the difference image being a difference image between a first calibration image and a second calibration image and being configured of: a center block area positioned in a central part of the difference image; a peripheral block area positioned on a periphery of the center block area; and a background area which is an area other than the center block area and the peripheral block area, the projector comprising:

image projection means for projecting the first and second calibration images at different timings onto a projection target;

sensing means for sensing the projected first calibration image at a low resolution which is less than or equal to a predetermined resolution and generating first sensing information, sensing the first calibration image at a high resolution which is greater than or equal to the low resolution and generating third sensing information, and sensing the second calibration image at the high resolution and generating second sensing information;

projection area detection means for generating projection area information relating to a position of a projection area in a sensing area of the sensing means, based on the first and second sensing information;

projection-target area detection means for generating projection-target area information relating to a position of a projection-target area corresponding to the projection target in the sensing area of the sensing means, based on the first, second, and third sensing information; and image distortion correction means for correcting distortion of an image to be projected by the image projection means, based on the projection area information and the projection-target area information, wherein at least an outer peripheral portion of the second calibration image has a brightness index value of zero, wherein the projection area detection means comprises:

difference image generation means for generating the difference image, based on the first and second sensing information;

center reference position detection means for detecting a plurality of center reference positions of the center block area in the sensing area of the sensing means, based on the difference image;

peripheral reference position detection means for detecting a plurality of peripheral reference positions of the peripheral block area in the sensing area, based on the center reference positions; and projection area information generation means for generating the projection area information, based on the center reference positions and the peripheral reference positions, wherein the projection-target area detection means comprises:

search range determination means for setting a search range for edge detection in an outer portion of the center block area;

edge detection means for performing edge detection based on the first sensing information and the search range and generating first edge detection information, and also performing edge detection based on the third sensing information and generating third edge detection information; and projection-target area information generation means for generating provisional detection information by provisionally detecting the projection-target area based on the first edge detection information, and also generating the projection-target area information based on the third edge detection information, and wherein the edge detection means generates the third edge detection information by performing edge detection on a pixel group around a boundary of the provisionally detected projection-target area, based on the provisional detection information.

According to a third aspect of the present invention, there is provided a program for causing a computer to function as an image processing system which performs image processing based on a difference image, the difference image being a difference image between a first calibration image and a second calibration image and being configured of: a center block area positioned in a central part of the difference image; a peripheral block area positioned on a periphery of the center block area; and a background area which is an area other than the center block area and the peripheral block area, the program for causing the computer to function as:

image projection means for projecting the first and second calibration images at different timings onto a projection target;

sensing means for sensing the projected first calibration image at a low resolution which is less than or equal to a predetermined resolution and generating first sensing information, sensing the first calibration image at a high resolution which is greater than or equal to the low resolution and generating third sensing information, and sensing the second calibration image at the high resolution and generating second sensing information;

projection area detection means for generating projection area information relating to a position of a projection area in a sensing area of the sensing means, based on the first and second sensing information;

projection-target area detection means for generating projection-target area information relating to a position of a projection-target area corresponding to the projection target in the sensing area of the sensing means, based on the first, second, and third sensing information; and image distortion correction means for correcting distortion of an image to be projected by the image projection means, based on the projection area information and the projection-target area information, wherein at least an outer peripheral portion of the second calibration image has a brightness index value of zero, wherein the projection area detection means comprises:

difference image generation means for generating the difference image, based on the first and second sensing information;

center reference position detection means for detecting a plurality of center reference positions of the center block area in the sensing area of the sensing means, based on the difference image;

peripheral reference position detection means for detecting a plurality of peripheral reference positions of the peripheral block area in the sensing area, based on the center reference positions; and projection area information generation means for generating the projection area information, based on the center reference positions and the peripheral reference positions, wherein the projection-target area detection means comprises:

search range determination means for setting a search range for edge detection in an outer portion of the center block area;

edge detection means for performing edge detection based on the first sensing information and the search range and generating first edge detection information, and also performing edge detection based on the third sensing information and generating third edge detection information; and projection-target area information generation means for generating provisional detection information by provisionally detecting the projection-target area based on the first edge detection information, and also generating the projection-target area information based on the third edge detection information, and wherein the edge detection means generates the third edge detection information by performing edge detection on a pixel group around a boundary of the provisionally detected projection-target area, based on the provisional detection information.

According to a fourth aspect of the present invention, there is provided an information storage medium storing a computer-readable program, the information storage medium storing the above program.

According to a fifth aspect of the present invention, there is provided an image processing method for performing image processing based on a difference image, the difference image being a difference image between a first calibration image and a second calibration image and being configured of: a center block area positioned in a central part of the difference image; a peripheral block area positioned on a periphery of the center block area; and a background area which is an area other than the center block area and the peripheral block area, wherein at least an outer peripheral portion of the second calibration image has a brightness index value of zero, the image processing method comprising:

projecting the first calibration image towards a projection target;

sensing the projected first calibration image at a low resolution which is less than or equal to a predetermined resolution and generating first sensing information;

sensing the projected first calibration image at a high resolution which is greater than or equal to the low resolution and generating third sensing information;

projecting the second calibration image toward the projection target;

sensing the projected second calibration image at the high resolution and generating second sensing information;

generating the difference image based on the first and second sensing information;

detecting a plurality of center reference positions of the center block area in a sensing area, based on the difference image;

detecting a plurality of peripheral reference positions of the peripheral block area in the sensing area, based on the center reference positions;

generating projection area information relating to a position of a projection area within the sensing area, based on the center reference positions and the peripheral reference positions;

setting a search range for edge detection in an outer portion of the center block area;

performing edge detection based on the first sensing information and the search range, and generating first edge detection information;

provisionally detecting a projection-target area, based on the first edge detection information, and generating provisional detection information;

generating third edge detection information by performing edge detection on a pixel group around a boundary of the provisionally-detected projection-target area, based on the third sensing information and the provisional detection information;

generating projection-target area information relating to a position of the projection-target area in the sensing area, based on the third edge detection information; and correcting image distortion, based on the projection area information and the projection-target area information.

DETAILED DESCRIPTION OF THE EMBODIMENT

Figure 1:
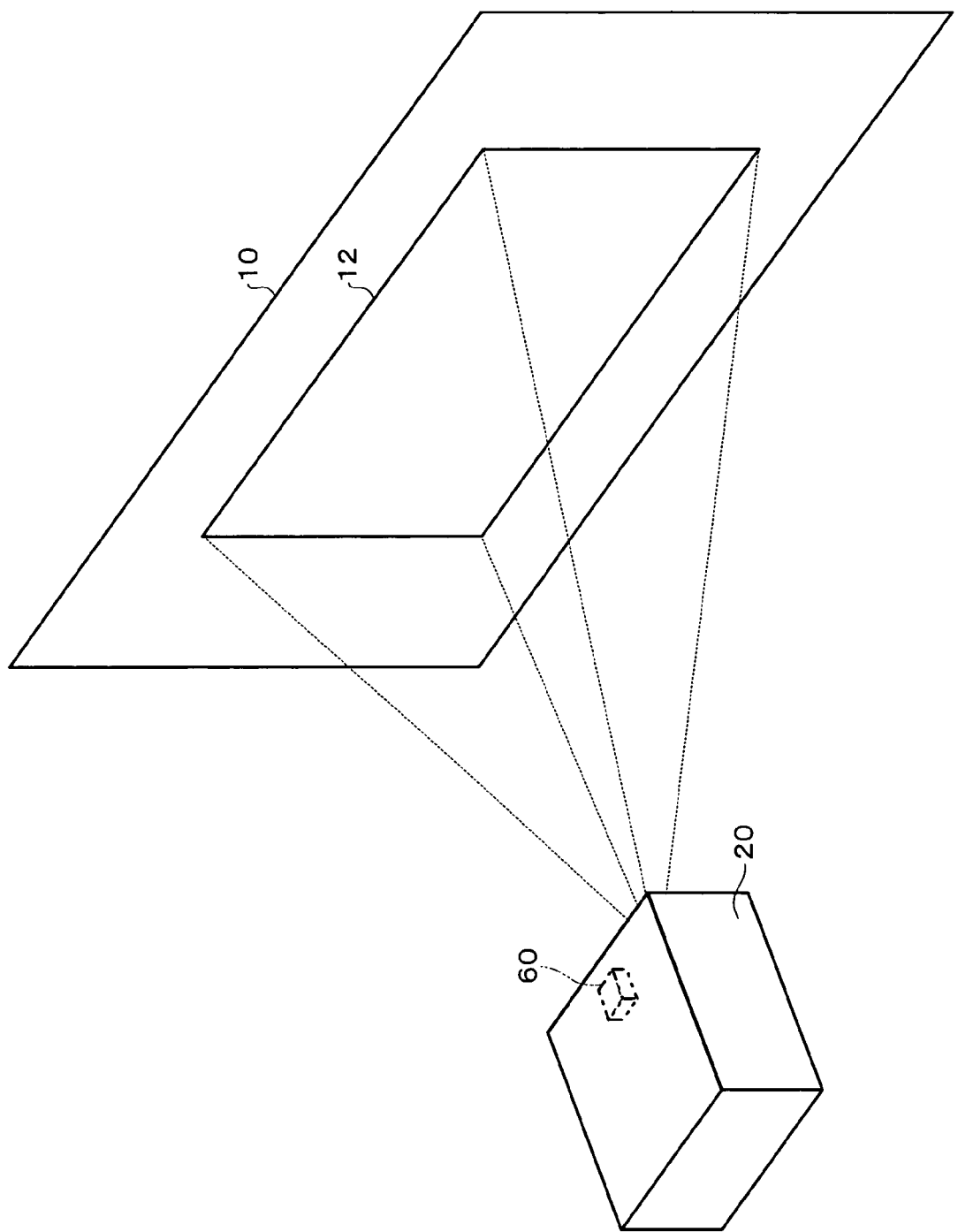
FIG. 1 is a schematic view of an image projection state in accordance with an example of an embodiment of the present invention.

This embodiment was devised in the light of the above-described technical problems, with the objective of providing an image processing system, a projector, a program, an information storage medium, and an image processing method that enable correction of a projection image in a shorter time and also more accurately, based on the positional relationship between the projection image and a projection target.

According to one embodiment of the present invention, there are provided an image processing system and a projector which performs image processing based on a difference image, the difference image being a difference image between a first calibration image and a second calibration image and being configured of: a center block area positioned in a central part of the difference image; a peripheral block area positioned on a periphery of the center block area; and a background area which is an area other than the center block area and the peripheral block area, the image processing system and the projector comprising:

image projection means for projecting the first and second calibration images at different timings onto a projection target;

sensing means for sensing the projected first calibration image at a low resolution which is less than or equal to a predetermined resolution and generating first sensing information, sensing the first calibration image at a high resolution which is greater than or equal to the low resolution and generating third sensing information, and sensing the second calibration image at the high resolution and generating second sensing information;

projection area detection means for generating projection area information relating to a position of a projection area in a sensing area of the sensing means, based on the first and second sensing information;

projection-target area detection means for generating projection-target area information relating to a position of a projection-target area corresponding to the projection target in the sensing area of the sensing means, based on the first, second, and third sensing information; and image distortion correction means for correcting distortion of an image to be projected by the image projection means, based on the projection area information and the projection-target area information, wherein at least an outer peripheral portion of the second calibration image has a brightness index value of zero, wherein the projection area detection means comprises:

difference image generation means for generating the difference image, based on the first and second sensing information;

center reference position detection means for detecting a plurality of center reference positions of the center block area in the sensing area of the sensing means, based on the difference image;

peripheral reference position detection means for detecting a plurality of peripheral reference positions of the peripheral block area in the sensing area, based on the center reference positions; and projection area information generation means for generating the projection area information, based on the center reference positions and the peripheral reference positions, wherein the projection-target area detection means comprises:

search range determination means for setting a search range for edge detection in an outer portion of the center block area;

edge detection means for performing edge detection based on the first sensing information and the search range and generating first edge detection information, and also performing edge detection based on the third sensing information and generating third edge detection information; and projection-target area information generation means for generating provisional detection information by provisionally detecting the projection-target area based on the first edge detection information, and also generating the projection-target area information based on the third edge detection information, and wherein the edge detection means generates the third edge detection information by performing edge detection on a pixel group around a boundary of the provisionally detected projection-target area, based on the provisional detection information.

According to another embodiment of the present invention, there is provided a program for causing a computer to function as an image processing system which performs image processing based on a difference image, the difference image being a difference image between a first calibration image and a second calibration image and being configured of: a center block area positioned in a central part of the difference image; a peripheral block area positioned on a periphery of the center block area; and a background area which is an area other than the center block area and the peripheral block area, the program for causing the computer to function as:

image projection means for projecting the first and second calibration images at different timings onto a projection target;

sensing means for sensing the projected first calibration image at a low resolution which is less than or equal to a predetermined resolution and generating first sensing information, sensing the first calibration image at a high resolution which is greater than or equal to the low resolution and generating third sensing information, and sensing the second calibration image at the high resolution and generating second sensing information;

projection area detection means for generating projection area information relating to a position of a projection area in a sensing area of the sensing means, based on the first and second sensing information;

projection-target area detection means for generating projection-target area information relating to a position of a projection-target area corresponding to the projection target in the sensing area of the sensing means, based on the first, second, and third sensing information; and image distortion correction means for correcting distortion of an image to be projected by the image projection means, based on the projection area information and the projection-target area information, wherein at least an outer peripheral portion of the second calibration image has a brightness index value of zero, wherein the projection area detection means comprises:

difference image generation means for generating the difference image, based on the first and second sensing information;

center reference position detection means for detecting a plurality of center reference positions of the center block area in the sensing area of the sensing means, based on the difference image;

peripheral reference position detection means for detecting a plurality of peripheral reference positions of the peripheral block area in the sensing area, based on the center reference positions; and projection area information generation means for generating the projection area information, based on the center reference positions and the peripheral reference positions, wherein the projection-target area detection means comprises:

search range determination means for setting a search range for edge detection in an outer portion of the center block area;

edge detection means for performing edge detection based on the first sensing information and the search range and generating first edge detection information, and also performing edge detection based on the third sensing information and generating third edge detection information; and projection-target area information generation means for generating provisional detection information by provisionally detecting the projection-target area based on the first edge detection information, and also generating the projection-target area information based on the third edge detection information, and wherein the edge detection means generates the third edge detection information by performing edge detection on a pixel group around a boundary of the provisionally detected projection-target area, based on the provisional detection information.

According to a further embodiment of the present invention, there is provided an information storage medium storing a computer-readable program, the information storage medium storing the above program.

According to still another embodiment of the present invention, there is provided an image processing method for performing image processing based on a difference image, the difference image being a difference image between a first calibration image and a second calibration image and being configured of: a center block area positioned in a central part of the difference image; a peripheral block area positioned on a periphery of the center block area; and a background area which is an area other than the center block area and the peripheral block area, wherein at least an outer peripheral portion of the second calibration image has a brightness index value of zero, the image processing method comprising:

projecting the first calibration image towards a projection target;

sensing the projected first calibration image at a low resolution which is less than or equal to a predetermined resolution and generating first sensing information;

sensing the projected first calibration image at a high resolution which is greater than or equal to the low resolution and generating third sensing information;

projecting the second calibration image toward the projection target;

sensing the projected second calibration image at the high resolution and generating second sensing information;

generating the difference image based on the first and second sensing information;

detecting a plurality of center reference positions of the center block area in a sensing area, based on the difference image;

detecting a plurality of peripheral reference positions of the peripheral block area in the sensing area, based on the center reference positions;

generating projection area information relating to a position of a projection area within the sensing area, based on the center reference positions and the peripheral reference positions;

setting a search range for edge detection in an outer portion of the center block area;

performing edge detection based on the first sensing information and the search range, and generating first edge detection information;

provisionally detecting a projection-target area, based on the first edge detection information, and generating provisional detection information;

generating third edge detection information by performing edge detection on a pixel group around a boundary of the provisionally-detected projection-target area, based on the third sensing information and the provisional detection information;

generating projection-target area information relating to a position of the projection-target area in the sensing area, based on the third edge detection information; and correcting image distortion, based on the projection area information and the projection-target area information.

These embodiments make it possible for the image processing system and the like to generate positional information of the projection-target area within a shorter time and also more accurately, by basing a provisional detection of the projection-target area on low-resolution sensing information then basing the detection of the projection-target area on high-resolution sensing information around boundary lines obtained by the provisional detection of the projection-target area.

By using a calibration image in which the brightness index value of an outer peripheral portion is zero, these embodiments make it possible for the image processing system and the like to detect edges up to the boundary or outer sides of the projection area within the sensed image, even when part of the projection image overlaps the boundary, when an edge of part of the projection image projects from the boundary of the screen whereas the edges of the rest are within the screen, or when the projection image is within the screen, thus enabling suitable detection of the boundaries of the projection-target area within the sensed image, making it possible to generate the positional information of the projection-target area accurately.

Since these embodiments also make it possible for the image processing system and the like to determine the position of the projection area based on a plurality of center reference positions and a plurality of peripheral reference positions, not on the entire image, the positional information for the projection area can be generated in a shorter time.

Therefore, these embodiments make it possible for the image processing system and the like to correct a projection image in a shorter time and also more accurately, based on the positional relationship between the projection image and the projection target.

Note that a monochromatic image that has a brightness index value other than zero could be employed as the first calibration image, by way of example. The second calibration image could be an image configured of a center block area positioned around the center of the second calibration image, a peripheral block area which is an area positioned on the periphery of that center block area and which also comprises an outer peripheral portion of the second calibration image, and a background area that is the area other than the center block area and the peripheral block area, where the center block area and the peripheral block area have brightness index values of zero and the brightness index value of the background area is the same as that of the monochromatic image.

In the image processing system, projector, program, and information storage medium, the edge detection means may perform edge detection based on a second sensing information and may generate second edge detection information; and when a first edge detection point based on the first edge detection information is not within a predetermined pixel range around a boundary of the projection area based on the projection area information, the projection-target area information generation means may determine whether or not the first edge detection point matches a second edge detection point based on the second edge detection information, and may generate the provisional detection information based on the second edge detection point when the determination result is true, or may cause the edge detection means to detect again an edge for pixels which differ from the first and second edge detection points when the determination result is false.

The image processing method may further comprise:

determining whether or not a first edge detection point based on the first edge detection information is within a predetermined pixel range around a boundary of the projection area based on the projection area information;

performing edge detection based on the second sensing information when the determination result is false, to generate second edge detection information;

determining whether or not the first edge detection point matches a second edge detection point, based on the second edge detection information; and generating the provisional detection information based on the second edge detection point when the determination result is true, or detecting again an edge for pixels which differ from the first and second edge detection points by the edge detection means when the determination result is false.

This makes it possible for the image processing system and the like to identify the boundaries of the projection-target area appropriately, even when the boundary of the projection target overlaps all or part of the boundary of the projection image.

In the image processing system, projector, program, and information storage medium, the image distortion correction means may comprise:

projectable area information generation means for generating projectable area information relating to a projectable area, based on the projection area information and the projection-target area information;

correction amount calculation means for calculating a correction amount for correcting at least one of a position, size, and distortion of an image to be projected by the image projection means, based on the projection area information, the projection-target area information, and the projectable area information; and image signal correction means for correcting an image signal, based on the correction amount, and the image projection means may project an image based on the corrected image signal.

The image processing method may further comprise, during correcting distortion of the image:

generating projectable area information relating to a projectable area, based on the projection area information and the projection-target area information;

calculating a correction amount for correcting at least one of a position, size, and distortion of the image, based on the projection area information, the projection-target area information, and the projectable area information;

correcting an image signal, based on the correction amount; and projecting an image, based on the corrected image signal.

Since this makes it possible for the image processing system and the like to determine the projectable area and correct errors such as image distortion, the image can be corrected more appropriately.

In the image processing system, projector, program, and information storage medium, the image projection means may comprise angle of view adjustment means for adjusting an angle of view of a projection lens, and the angle of view adjustment means may adjust the angle of view, based on a correction amount for correcting a size of the image which is output by the correction amount calculation means.

The image processing method may comprise:

adjusting an angle of view of a projection lens, based on a correction amount for correcting a size of the image. This makes it possible for the image processing system and the like to project an image at the optimal size, using zoom control.

In the image processing system, projector, program, and information storage medium, the edge detection means may detect edges at a plurality of locations within a first sensed image based on the first sensing information, and may generate the first edge detection information, and the projection-target area information generation means may generate the provisional detection information by setting a linear approximation straight line or linear approximation curve, based on positional information of the plurality of locations based on the first edge detection information.

The image processing method may comprise:

detecting edges at a plurality of locations within a first sensed image based on the first sensing information, and generating the first edge detection information; and generating the provisional detection information by setting a linear approximation straight line or linear approximation curve, based on positional information of the plurality of locations based on the first edge detection information.

This makes it possible for the image processing system and the like to generate positional information of the projection-target area within a shorter time, by performing the edge detection in a state in which the area subjected to the edge detection processing has been reduced.

In the image processing system, projector, program, and information storage medium, the projection-target area detection means may comprise a detection point evaluation means for evaluating a plurality of edge detection points, and the detection point evaluation means may determine whether or not each of the plurality of edge detection points is distanced from the linear approximation straight line or the linear approximation curve by at least a predetermined value, and may control the projection-target area information generation means in such a manner that a detection point which is distanced by at least the predetermined value is excluded and the linear approximation straight line or the linear approximation curve is reset.

The image processing method may comprise:

determining whether or not each of a plurality of edge detection points is distanced from the linear approximation straight line or the linear approximation curve by at least a predetermined value; and excluding a detection point which is distanced by at least the predetermined value and resetting the linear approximation straight line or the linear approximation curve.

This makes it possible for the image processing system and the like to reduce the effects of noise and generate the positional information of the projection-target area more accurately, by excluding detection points that are distanced from the linear approximation straight line or the like from the processing.

In the image processing system, projector, program, and information storage medium, the projection area information generation means may generate the projection area information by setting a plurality of approximation straight lines or approximation curves based on the center reference positions and the peripheral reference positions and determining a shape or arrangement of the center block area and the peripheral block area.

The image processing method may comprise:

generating the projection area information by setting a plurality of approximation straight lines or approximation curves based on the center reference positions and the peripheral reference positions and determining a shape or arrangement of the center block area and the peripheral block area.

The image processing system, projector, program, and information storage medium, the projection area and the center block area may be rectangular areas, and the projection area information generation means may determine positions of four corners of the center block area by detecting intersections of the plurality of approximation straight lines or intersections of the plurality of approximation curves, and may generate the projection area information indicating the positions of four corners of the projection area, based on the positions of the four corners of the center block area.

In the image processing method, the projection area and the center block area may be rectangular areas, the image processing method may comprise:

determining positions of four corners of the center block area by detecting intersections of the plurality of approximation straight lines or intersections of the plurality of approximation curves, and generating the projection area information indicating the positions of four corners of the projection area, based on the positions of the four corners of the center block area.

Since this makes it possible for the image processing system and the like to base the determination of the positions of the four corners of the projection on the positions of the four corners of the center block area, the positions of the four corners of the projection area can be determined with less processing.

In the image processing system, projector, program, and information storage medium, the projection-target area detection means may comprise a projection-target area boundary point detection means for detecting a plurality of boundary points of the projection-target area, based on the first sensing information and the center reference positions, and the peripheral reference position detection means may detect the peripheral reference positions, based on the boundary points.

The image processing method may comprise:

detecting a plurality of boundary points of the projection-target area, based on the first sensing information and the center reference positions; and detecting the peripheral reference positions, based on the boundary points.

In this case, the peripheral reference position detection means and the image processing method could detect the peripheral reference positions that are positioned closer to the boundary points than the center reference positions.

Since this makes it possible for the image processing system and the like to base the generation of the positional information of the projection area on the plurality of reference positions that are widely spaced, the positional information of the projection area can be generated with greater precision without being affected by errors.

The present invention is described below as being applied to a projector having an image processing system, with reference to the accompanying figures. Note that the embodiments described below do not limit the scope of the invention defined by the claims laid out herein. In addition, not all of the elements of the embodiments described below should be taken as essential requirements of the present invention.

Description of Overall System

A schematic view of the image projection state of an example of this embodiment of the present invention is shown in FIG. 1.

A projector 20 projects an image towards a screen 10. This causes the display of a projection image 12 on the screen 10.

The projector 20 of this embodiment has a sensor 60 which is a sensing means. The sensor 60 senses the screen 10 on which the projection image 12 is displayed, through a sensing screen, and generates sensing information. The projector 20 determines the shape of the screen 10 by determining the position of the screen 10, based on the sensing information, and adjusts distortion of the projection image 12 and the display position thereof.

The projector 20 of this embodiment generates positional information for a projection-target area (an area corresponding to the screen 10) in a projection-target area within the sensing area of the sensor 60 and a projection area (an area corresponding to the projection image 12) within a shorter time and also more accurately, by performing image processing that differs from that in the prior art.

In addition, the projector 20 adjusts for factors such as the position or distortion of the projection image 12, based on the positional information of the projection area and the positional information of the projection-target area.

The description now turns to function blocks of the projector 20 for implementing the above functions.

Figure 2:
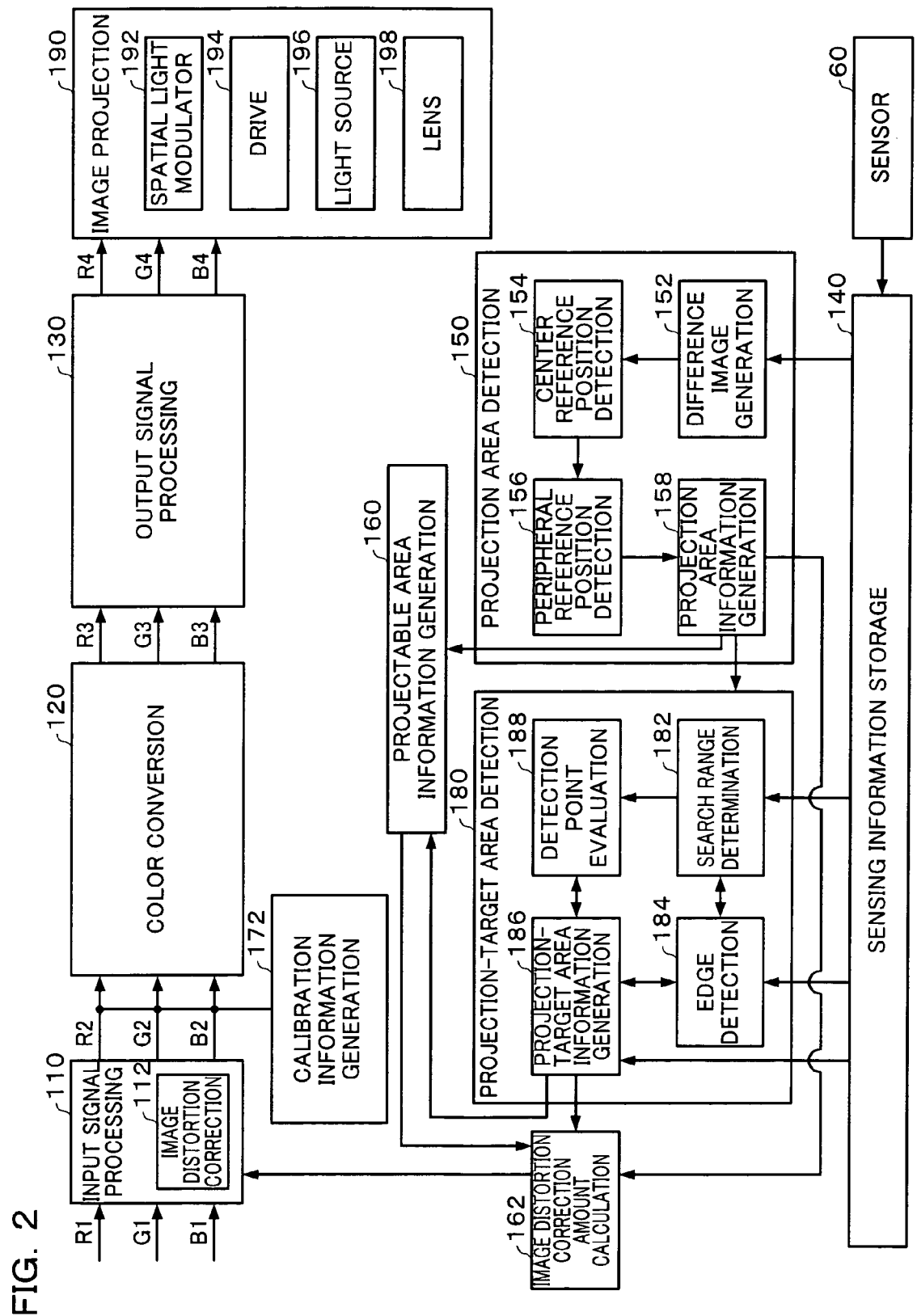
FIG. 2 is a functional block diagram of a projector of an example of an embodiment of the present invention.

A functional block diagram of the projector 20 in accordance with an example of this embodiment is shown in FIG. 2.

The projector 20 comprises an input signal processing section 110 that converts analog RGB signals (R1, G1, and B1) into digital RGB signals (R2, G2, and B2); a color conversion section 120 that converts those digital RGB signals (R2, G2, and B2) into digital RGB signals (R3, G3, and B3), in order to correct the color and brightness of the image; an output signal processing section 130 that converts those digital RGB signals (R3, G3, and B3) into analog RGB signals (R4, G4, and B4); and an image projection section 190 that projects an image based on those analog RGB signals.

The image projection section 190 comprises a spatial light modulator 192, a drive section 194 for driving the spatial light modulator 192, a light source 196, and a lens 198. The drive section 194 drives the spatial light modulator 192, based on analog RGB signals from the output signal processing section 130. The image projection section 190 projects light from the light source 196 through the spatial light modulator 192 and the lens 198.

The projector 20 also comprises a calibration information generation section 172 that generates calibration information for displaying first and second calibration images; the sensor 60 that generates sensing information for the calibration images; and a sensing information storage section 140 that temporarily stores sensing information from the sensor 60.

The projector 20 further comprises a projection area detection section 150 that detects the position of the projection area in the sensing screen (sensing area) of the sensor 60, based on the sensing information. The projection area detection section 150 comprises a difference image generation section 152 that generates a difference image between a first sensed image and a second sensed image, a center reference position detection section 154 that detects a plurality of center reference positions of a center block area comprised within the difference image, a peripheral reference position detection section 156 that detects a plurality of peripheral reference positions of peripheral block areas comprised within the difference image, and a projection area information generation section 158 that generates projection area information indicating the position of the projection area, based on the reference positions.

The projector 20 also comprises a projection-target area detection section 180 that generates projection-target area information relating to the position of the projection-target area that corresponds to the screen 10 in the sensing area of the sensor 60. A projection-target area detection section 180 comprises a search range determination section 182 that sets a search range for detecting edges, an edge detection section 184, a detection point evaluation section 188 that evaluates edge detection points, and a projection-target area information generation section 186 that generates provisional detection information from a provisional detection of the projection-target area and also generates projection-target area information.

The projector 20 also has image distortion correction means that corrects distortion of the projection image 12. More specifically, the projector 20 has a projectable area information generation section 160 that generates projectable area information, based on the projection area information and the projection-target area information; an image distortion correction amount calculation section 162 that calculates the amount of image distortion correction, based on the projection area information, the projection-target area information, and the projectable area information; and an image distortion correction section 112 that corrects the image signal, based on that image distortion correction amount; as the image distortion correction means.

The hardware for implementing the functions of the above-described components of the projector 20 could be as described below.

Figure 3:
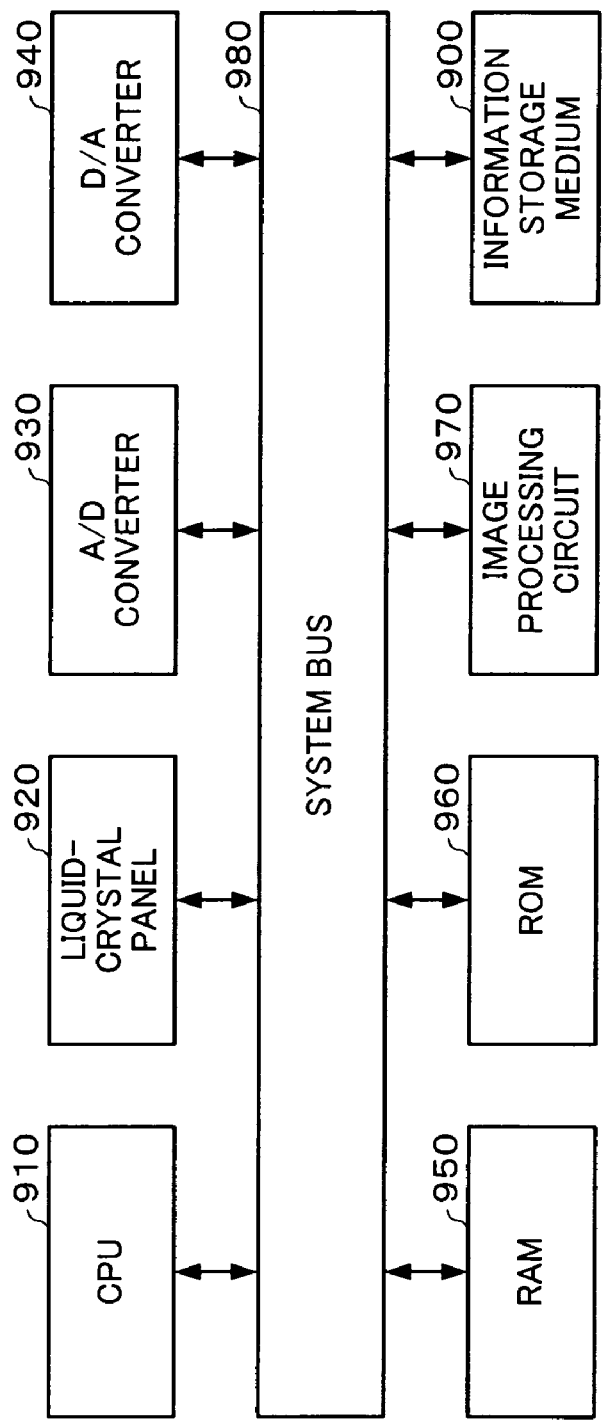
FIG. 3 is a hardware block diagram of a projector of an example of an embodiment of the present invention.

A block diagram of hardware for the projector 20 in accordance with an example of this embodiment is shown in FIG. 3.

For example, the configuration could be implemented by using an A/D converter 930 and image processing circuit 970, or the like, as the input signal processing section 110; RAM 950 or the like as the sensing information storage section 140; the image processing circuit 970 or the like as the projection area detection section 150 and the projection-target area detection section 180; a CPU 910 or the like as the image distortion correction amount calculation section 162; the image processing circuit 970 and the RAM 950, or the like, as the calibration information generation section 172; a D/A converter 940 or the like as the output signal processing section 130; a liquid-crystal panel 920 or the like as the spatial light modulator 192; and a ROM 960 in which is stored a liquid-crystal light valve driver for driving the liquid-crystal panel 920, as the drive section 194.

Note that these components can exchange information between themselves over a system bus 980. These components could also be implemented in a hardware fashion by circuitry, or in a software manner by drivers or the like.

In addition, an information storage medium 900 in which is stored a program that causes a computer to function as components such as the projectable area information generation section 160 could be installed in the computer, and the computer reads out the program in order to function as the projectable area information generation section 160, etc.

This information storage medium 900 could be a CD-ROM, DVD-ROM, ROM, RAM, or HDD, by way of example, and the method of reading the program therefrom could be a direct method or an indirect method.

Instead of the information storage medium 900, it is also possible to download a program that implements the above-described functions, from a host device through a transfer path, in order to implement the above-described functions.

The description now turns to the projection area position detection processing, the projection-target area position detection processing, and the adjustment processing performed on the projection image 12 that are performed using these components, in that order.

Flow of Projection Area Position Detection Processing

First of all, the flow of projection area position detection processing will be described.

Figure 4:
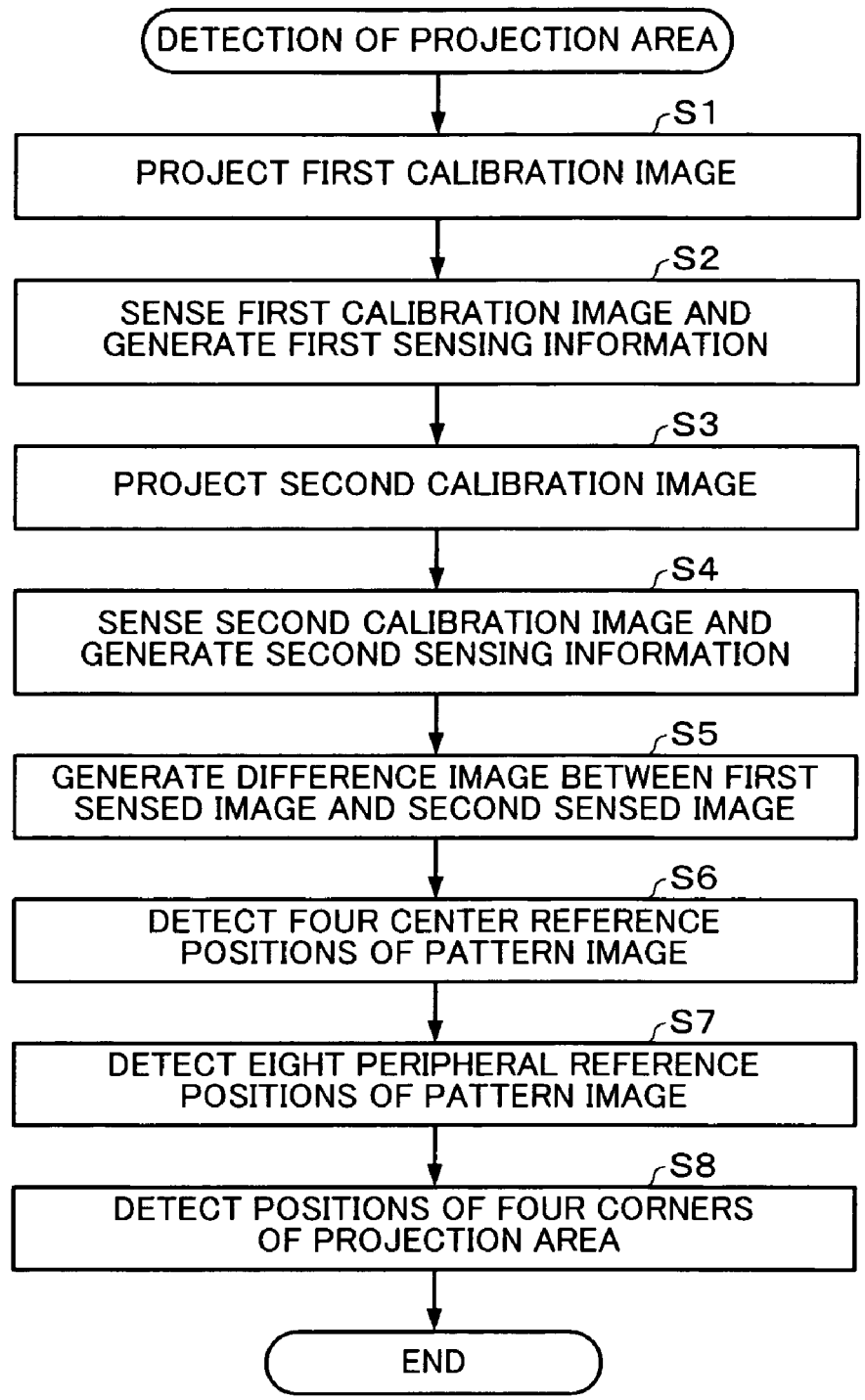
FIG. 4 is a flowchart of processing for detecting a position of a projection area in accordance with an example of an embodiment of the present invention.

A flowchart of the projection area position detection processing in accordance with an example of this embodiment is shown in FIG. 4. A conceptual view of a first calibration image 13 is shown in FIG. 5A and a conceptual view of a second calibration image 14 is shown in FIG. 5B.

Figure 5A:
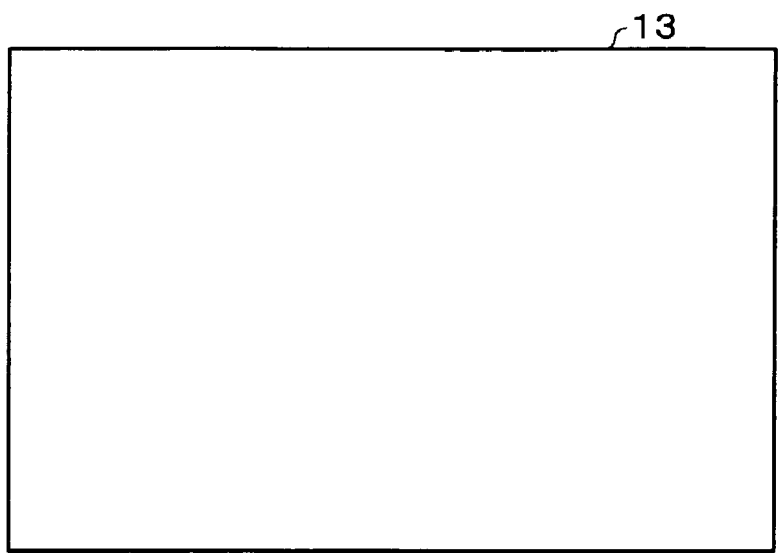
FIG. 5A is a conceptual view of a first calibration image in accordance with an example of an embodiment of the present invention.

The projector 20 first projects the all-white calibration image (in which the entire image is white) shown in FIG. 5A, as the first calibration image 13 (step S1). More specifically, the calibration information generation section 172 generates calibration information (such as RGB signals) for the first calibration image 13 and the image projection section 190 projects an all-white calibration image based on that calibration information.

The sensor 60 senses the first calibration image 13 at an automatic exposure setting, and generates first sensing information (step S2). The sensing information storage section 140 stores the first sensing information.

Figure 5B:
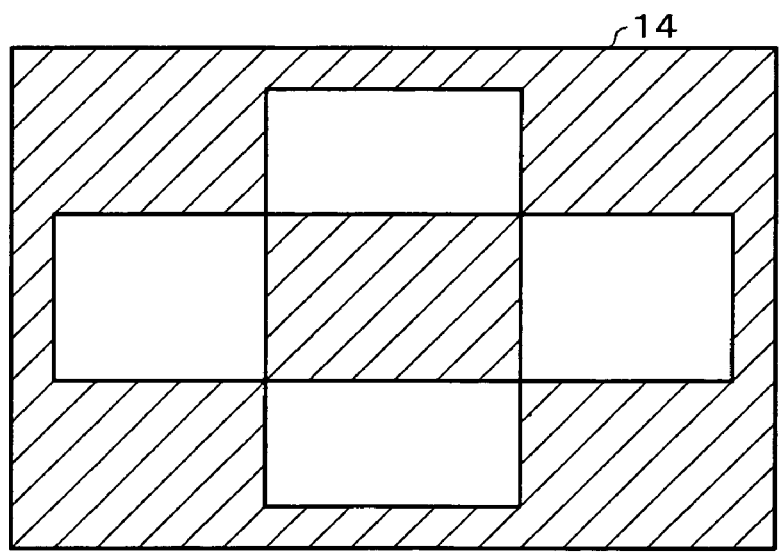
FIG. 5B is a conceptual view of a second calibration image in accordance with an example of an embodiment of the present invention.

The projector 20 then projects the second calibration image 14 shown in FIG. 5B as the second calibration image 14 (step S3). More specifically, the calibration information generation section 172 generates calibration information for the second calibration image 14 and the image projection section 190 projects the second calibration image 14 based on that calibration information.

In this example, the second calibration image 14 is composed of a center block area, four peripheral block areas, and a background area. As shown in FIG. 5B, the center block area is a shaded area in the center, each side of the center block area is connected to one of the peripheral block areas, and the background area is a shaded area other than the center block area and the peripheral block areas.

Note that the center block area and the background area are black-colored, and the peripheral block areas are white-colored. An outer peripheral portion of the second calibration image 14 is a part of the background area and is black-colored.

Note that "white-colored" means a brightness index value (such as luminance value, lightness value, illuminance value, or image signal value) that is not 0 (such as 255) and "black-colored" means a brightness index value of 0.

Since the use of black in the outer peripheral portion of the second calibration image 14 in this manner ensures that the projector 20 can search up to the boundaries or outer sides of the screen 10 in the sensed image, it makes it possible to detect the boundary lines of the screen 10 even when part of the projection image 12 protrudes beyond the boundary of the screen 10 while the remaining part is within the screen 10, when the projection image 12 is included within the screen, and particularly when the boundary of the projection image 12 overlaps the edge of the screen 10.

The sensor 60 senses the second calibration image 14 on the screen 10 at the same exposure as that for the first calibration image 13, and generates second sensing information (step S4). The sensing information storage section 140 stores the second sensing information.

The difference image generation section 152 generates a difference image between the first calibration image 13 and the second calibration image 14, based on the first and second sensing information (step S5). Note that this difference image is an image obtained by calculating differences such as those of luminance values for each pixel, by way of example. The difference image is an image having a difference value for each pixel if that difference value exceeds a predetermined threshold at that pixel, and zero at all other pixel positions, by way of example. Note that the difference image generation section 152 need not necessarily calculate differences for the entire image; it could also calculate differences only within a range (a portion of the image) that is necessary for the processing described below.

After the difference image is generated, the projection area detection section 150 detects a plurality of center reference positions (four in this example) of the center block area comprised within the difference image and a plurality of peripheral reference positions (eight in this example) comprised within the difference image.

Figure 6:
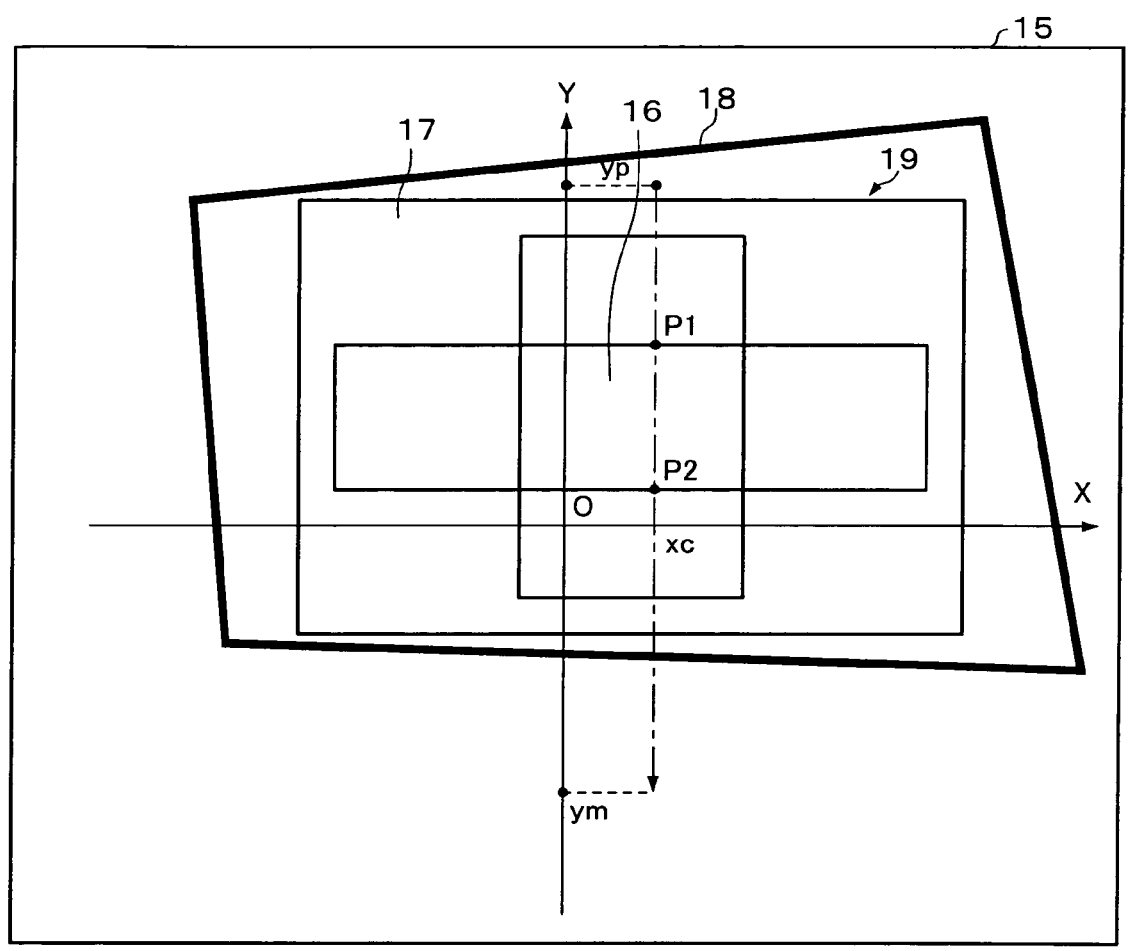
FIG. 6 is a conceptual view of a first step of a search method used during detection of center reference positions in accordance with an example of an embodiment of the present invention.
Figure 7:
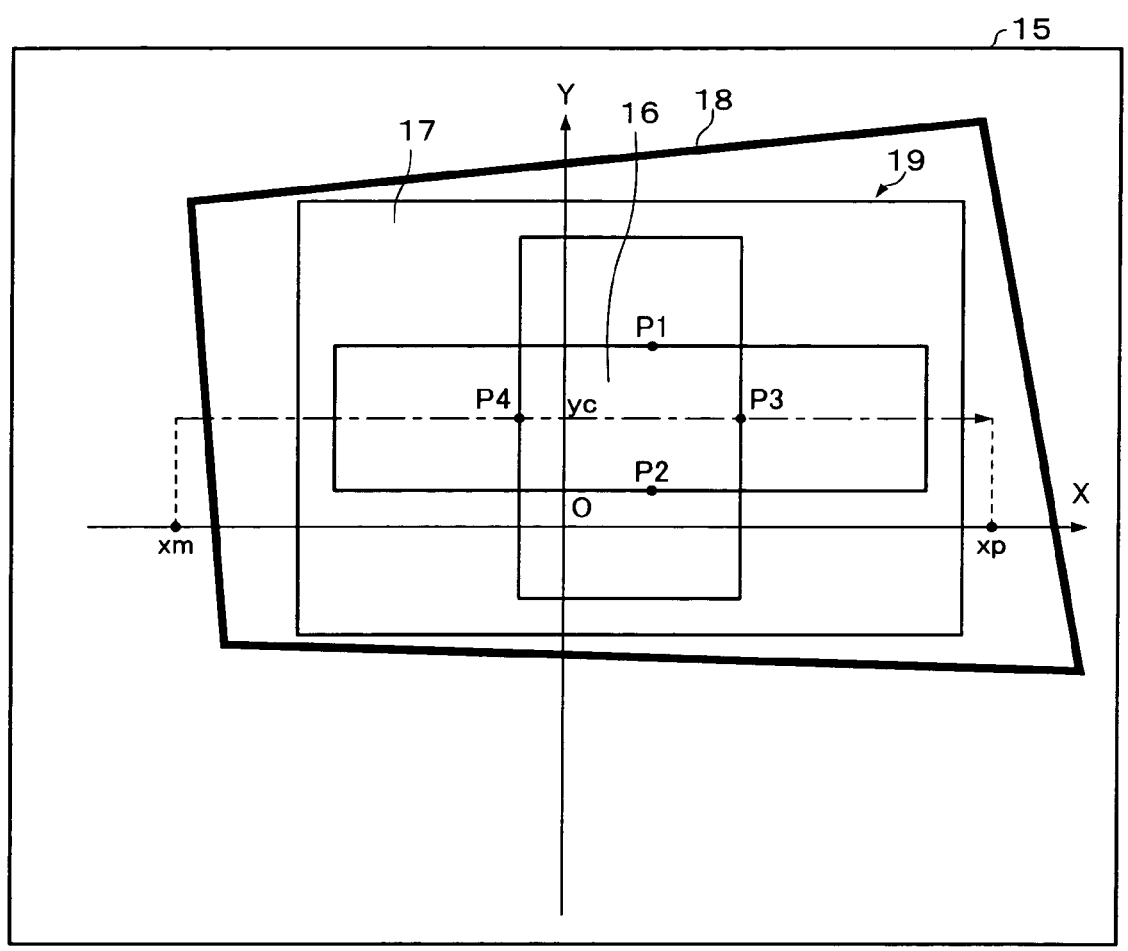
FIG. 7 is a conceptual view of a second step of a search method used during detection of center reference positions in accordance with an example of an embodiment of the present invention.

A conceptual view of a first step of a search method used in the detection of the center reference positions in accordance with an example of this embodiment is shown in FIG. 6. A conceptual view of a second step of a search method used in the detection of the center reference positions in accordance with an example of this embodiment is shown in FIG. 7.

The center reference position detection section 154 first detects the four center reference positions of the pattern image, in order to detect the position of the projection area 19 (the area corresponding to the projection image 12) in a sensing area 15 corresponding to the sensing screen (step S6). Note that a projection-target area 18 is shown in these figures to facilitate comprehension of the description, but it is possible that the projection-target area 18 will not exist in the difference image in practice.

More specifically, the center reference position detection section 154 identifies points P1 and P2 at which difference values change, by searching the difference values in the difference image for each pixel from y=yp to y=ym along a vertical line x=xc that is assumed to be positioned on a center block area 16, as shown in FIG. 6. Assume, by way of example that the coordinates of these two points are P1 (xc, y1) and P2 (xc, y2).

Note that values such as xc, yp, and ym for the search reference position could be determined by the angle of view and position of each of the lens 198 and the sensor 60, or they could be determined by experimentation, or they could be determined based on sensing results, by way of example. This also relates to other search reference positions used later in this description.

The center reference position detection section 154 then identifies points P4 and P3 at which difference values change, by searching the difference values in the difference image for each pixel from x=xm to x=xp along a horizontal line y=yc referenced to P1 and P2, as shown in FIG. 7. Note that in this case yc=(y1+y2)/2, by way of example.

Thus the center reference position detection section 154 outputs center reference positional information indicating the four center reference positions P1 (xc, y1), P2 (xc, y2), P3 (x1, yc), and P4 (x2, yc) of the center block area 16 to the peripheral reference position detection section 156.

The peripheral reference position detection section 156 detects the eight peripheral reference positions of the pattern image, based on the center reference positional information (step S7).

Figure 8:
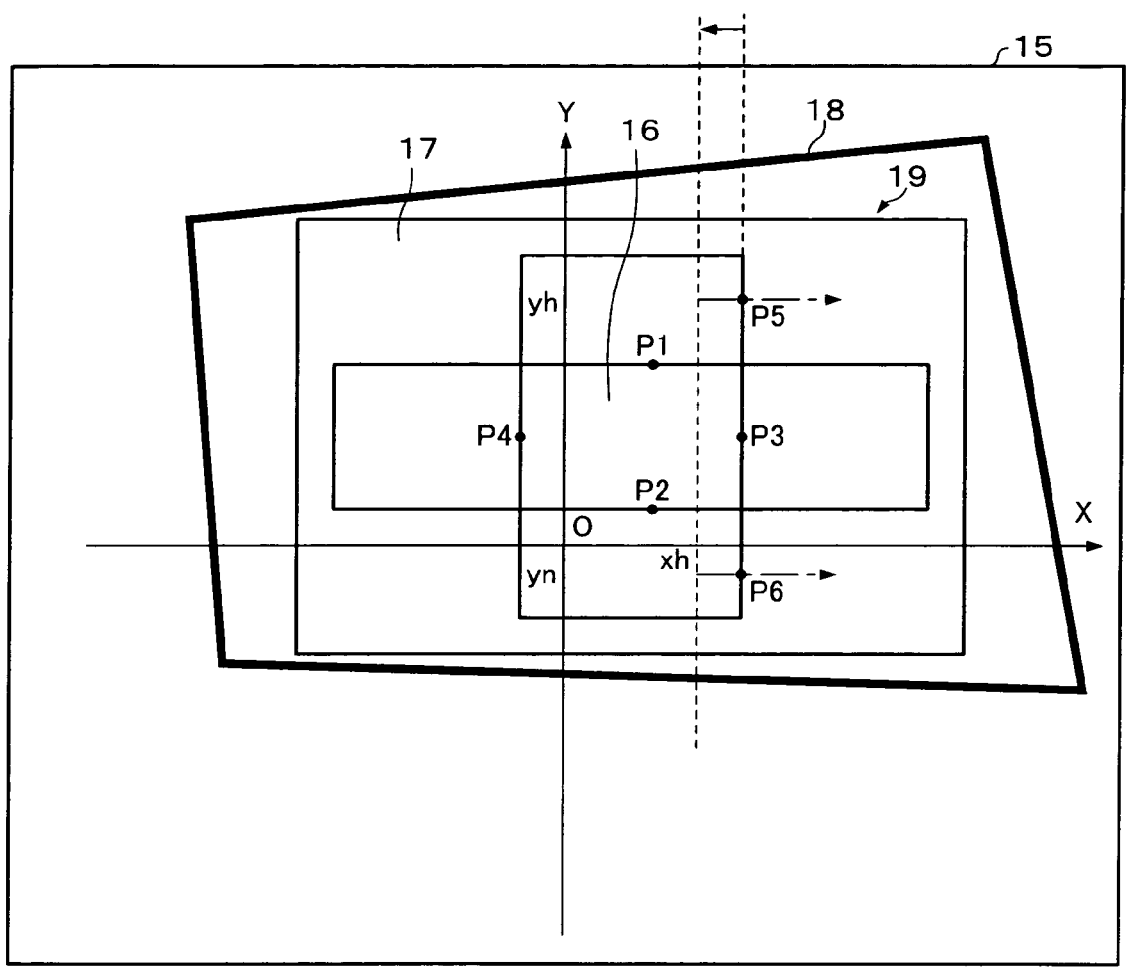
FIG. 8 is a conceptual view of a first step of a search method used during detection of peripheral reference positions in accordance with an example of an embodiment of the present invention.

A conceptual view of a first step of a search method used in the detection of the peripheral reference positions in accordance with an example of this embodiment is shown in FIG. 8. Similarly, a conceptual view of a second step of a search method used in the detection of the peripheral reference positions in accordance with an example of this embodiment is shown in FIG. 9.

More specifically, the peripheral reference position detection section 156 searches for a point at which there is a change in difference value in the pixels of the difference image, along the line y=yh from (x, y)=(xh, yh) toward the positive direction of the X-axis, where yh is above the y-coordinate y1 of P1 by m %, and xh is on the center side from the x-coordinate x1 of P3 by a few percentages. This identifies a point P5 at which the difference values change.

Similarly, the peripheral reference position detection section 156 searches for a point at which there is a change in difference value in the pixels of the difference image, along the line y=yn m % below the y-coordinate y2 of P2, in the positive direction of the x-axis from the x-coordinate xh. This identifies a point P6 at which the difference values change.

Figure 9:
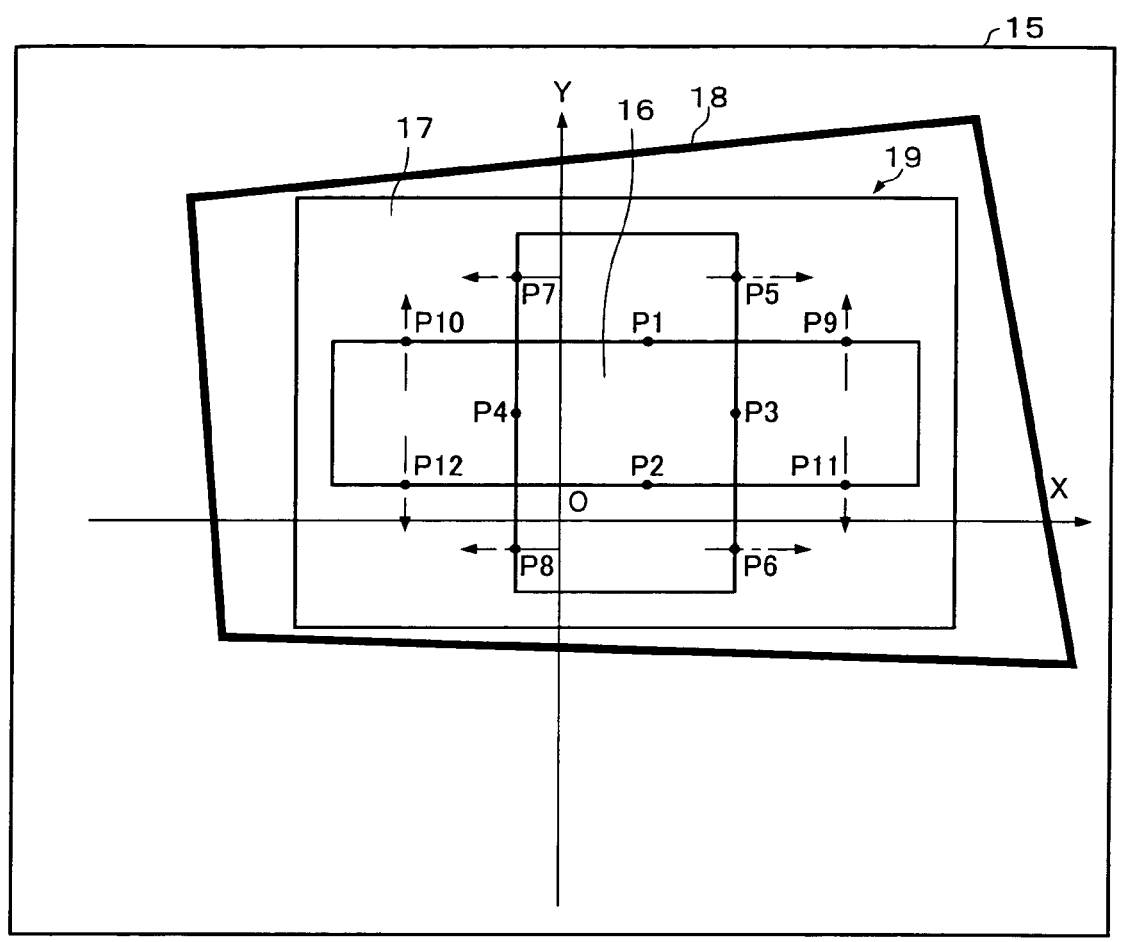
FIG. 9 is a conceptual view of a second step of a search method used during detection of peripheral reference positions in accordance with an example of an embodiment of the present invention.

By a similar method, points P7 to P12 are identified, as shown in FIG. 9. The peripheral reference position detection section 156 then outputs peripheral reference positional information indicating the coordinates of these eight points and center reference positional information to the projection area information generation section 158.

The projection area information generation section 158 uses approximation straight lines (or approximation curves) based on the peripheral reference positional information and the center reference positional information, to detect the positions of the projection area 19 (step S8).

Figure 10:
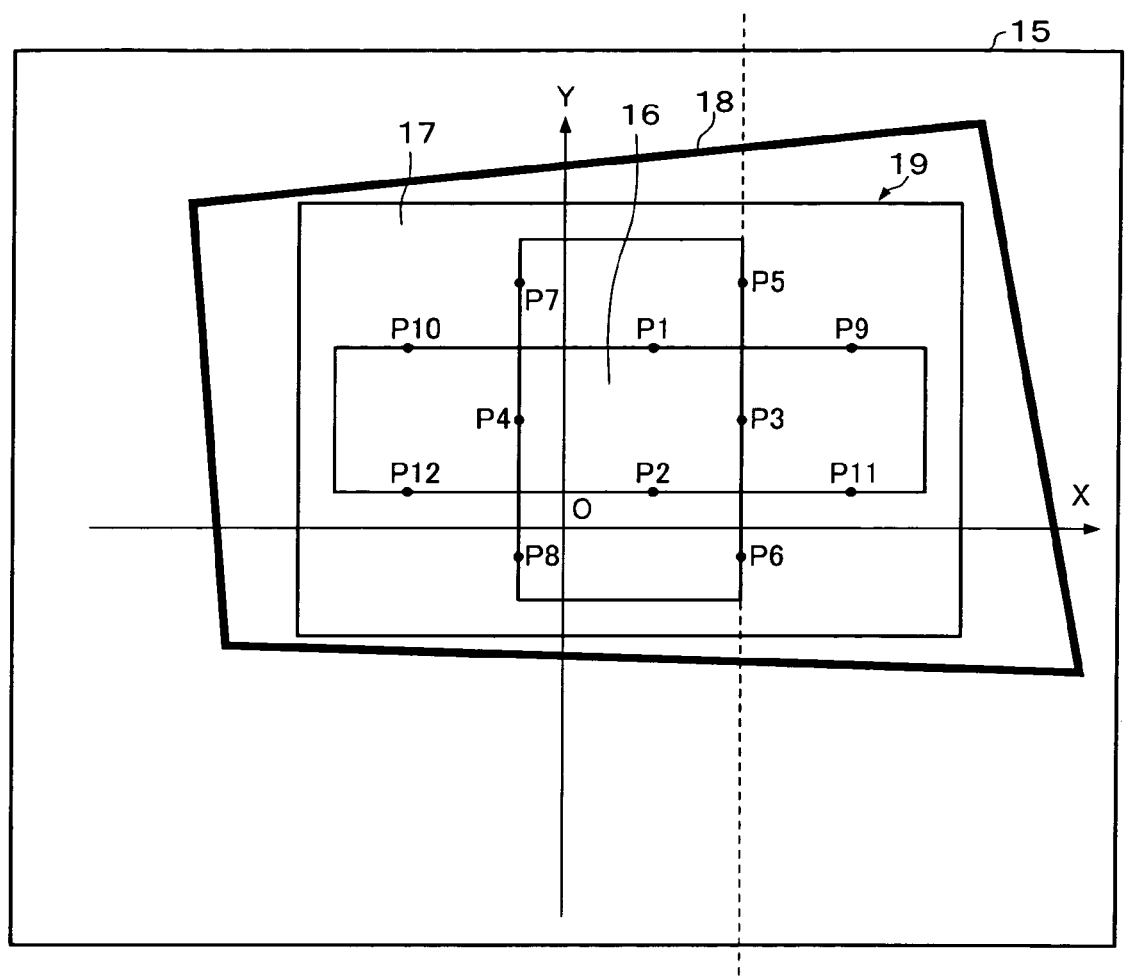
FIG. 10 is a conceptual view of a first step of setting approximation straight lines in accordance with an example of an embodiment of the present invention.
Figure 11:
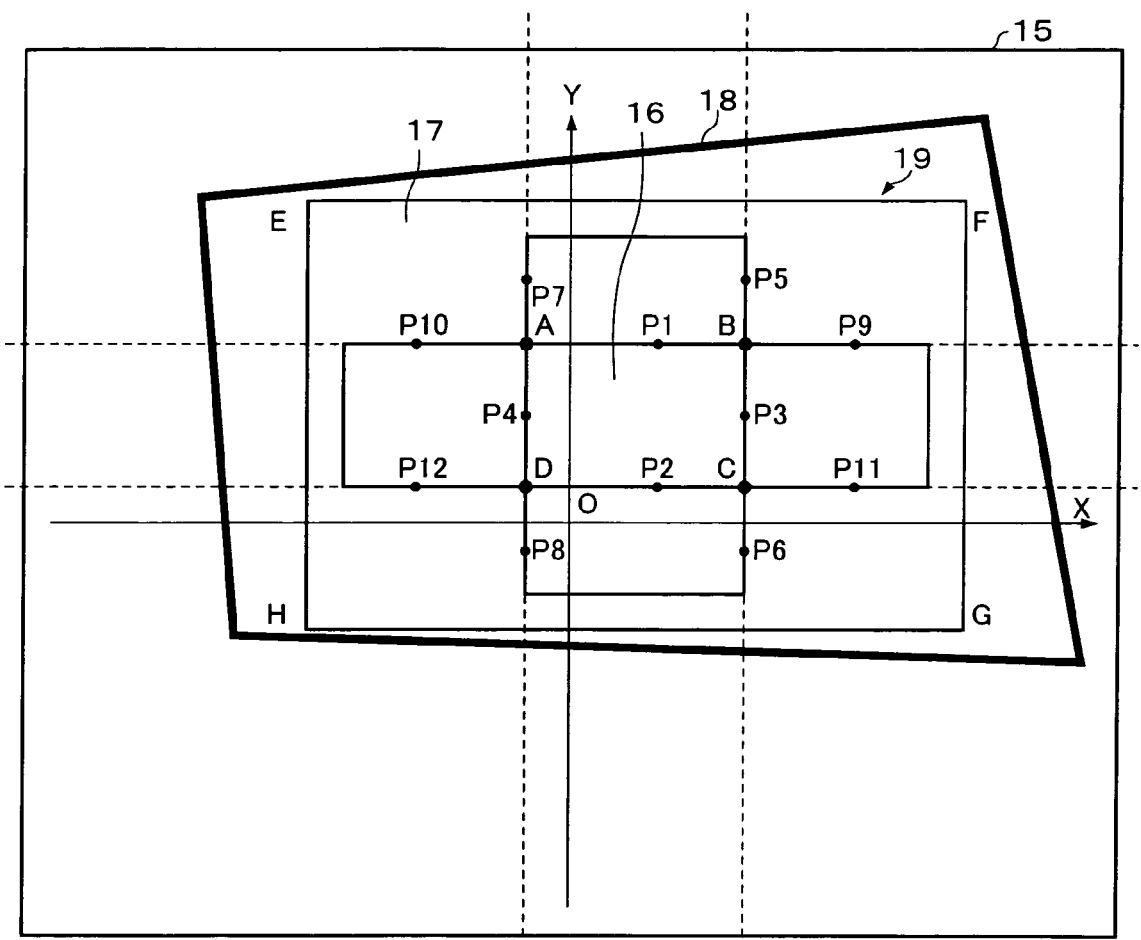
FIG. 11 is a conceptual view of a second step of setting approximation straight lines in accordance with an example of an embodiment of the present invention.

A conceptual view of a first step of setting approximation straight lines in accordance with an example of this embodiment is shown in FIG. 10. A conceptual view of a second step of setting approximation straight lines in accordance with an example of this embodiment is shown in FIG. 11.

The projection area information generation section 158 sets an approximation straight line, as shown by the broken line in FIG. 10, based on the coordinates of points P5, P3, and P6. By a similar method, the projection area information generation section 158 sets four approximation straight lines, as shown by the broken lines in FIG. 11, and identifies four intersections A (xA, yA) to D (xD, yD) between these approximation straight lines as the four corners of the center block area 16.

Since the center block area 16 has an area corresponding to an image that is shrunk to ⅛th of the original projection image 12, the description below assumes that the points EFGH of the four corners of the projection area 19 correspond to the projection image 12, assuming that the optical axis direction of the sensor 60 is substantially the same. In other words, E (xE, yE)=(2*xA−xC, 2*yA−yc), F (xF, yF)=(2*xB−xD, 2*yB−yD), G (xG, yG)=(2*xC−xA, 2*yC−yA), and H (xH, yH)=(2*xD−xB, 2*yD−yB).

As described above, this embodiment makes it possible to detect the positions of the four corners of the projection area 19 in the sensing area 15, even if part of the boundary of the projection image 12 overlaps the boundary of the screen 10, or if part of the projection image 12 is displayed outside the outer portion of the screen 10. Of course it is also possible for the projector 20 to convert the positional information of the projection area 19 into the plane of the screen 10, to generate positional information for the four corners of the projection image 12.

Flow of Projection-Target Area Position Detection Processing

The description now turns to the flow of position detection processing for the projection-target area 18.

Figure 12:
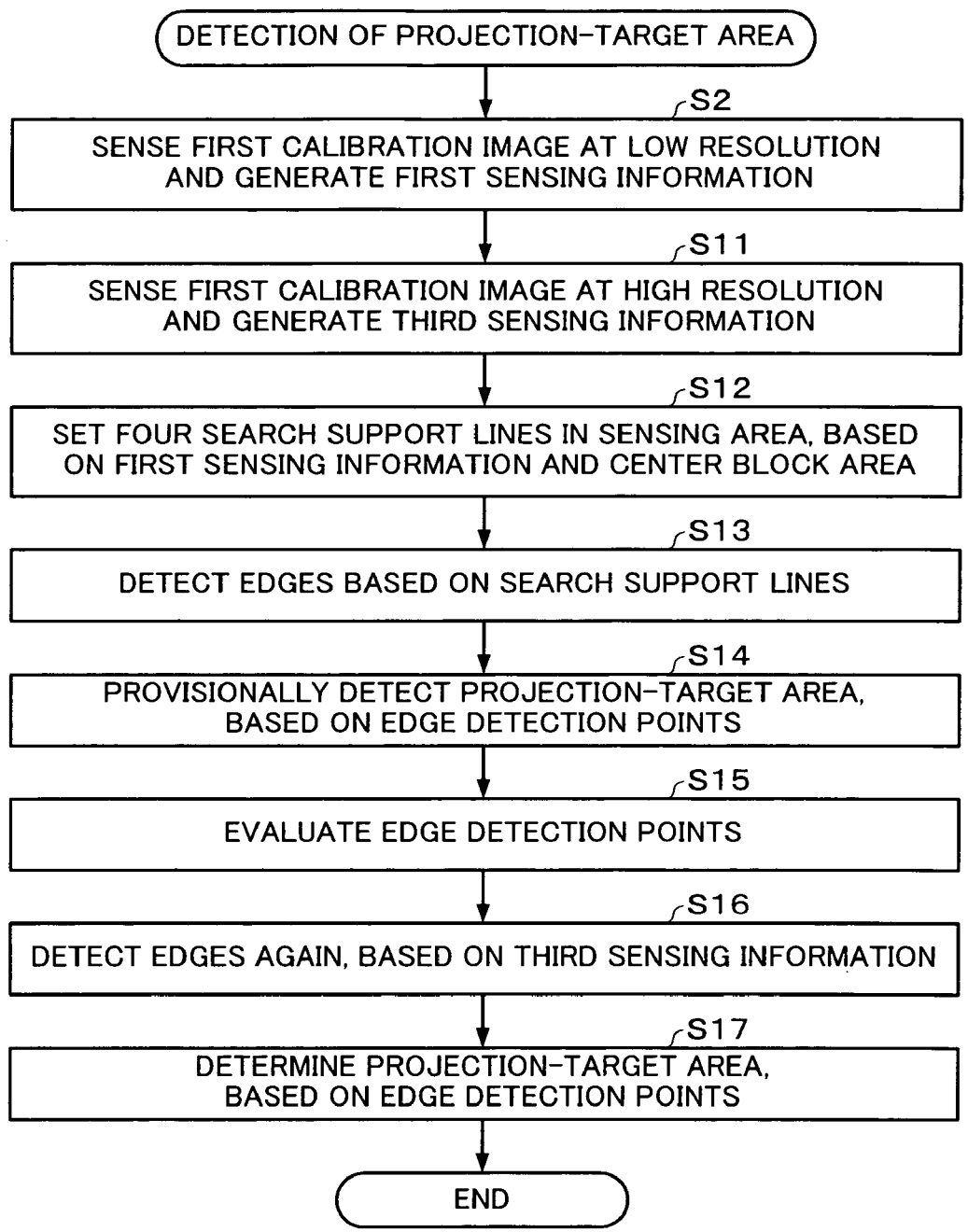
FIG. 12 is a flowchart of projection-target area position detection processing in accordance with an example of an embodiment of the present invention.

A flowchart of the position detection processing for the projection-target area 18 in accordance with an example of this embodiment is shown in FIG. 12.

In the above-described step S2, the sensor 60 senses the first calibration image 13 at a resolution (such as VGA) that is lower than a predetermined resolution (such as SVGA), to generate the first sensing information (step S2). The sensing information storage section 140 stores the first sensing information.

While the first calibration image 13 is still projected onto the screen 10, the sensor 60 then senses the first calibration image 13 at a resolution (such as XGA, SXGA, or UXGA) that is higher than the above-described low resolution, to generate the third sensing information (step S11). The sensing information storage section 140 stores the third sensing information.

The projection-target area detection section 180 generates the projection-target area information that indicates positional information of the projection-target area 18, based on the first, second, and third sensing information.

Figure 13:
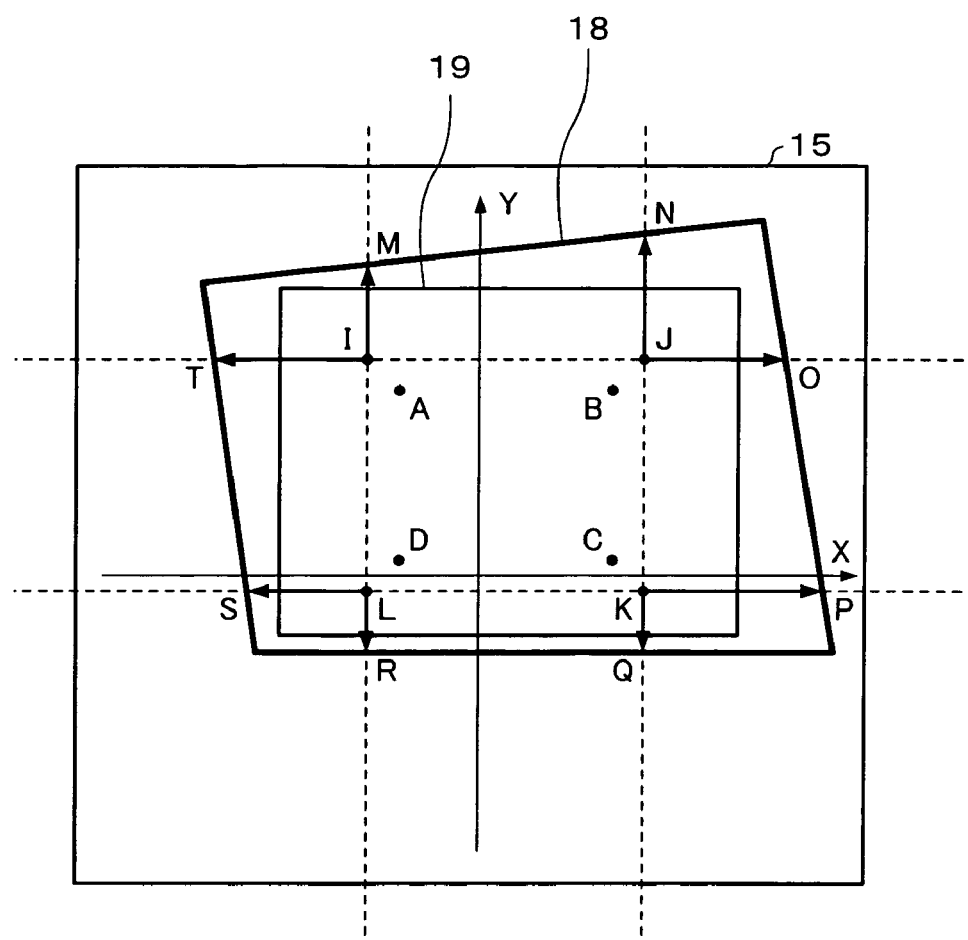
FIG. 13 is a conceptual view of a first step of a search method used during detection of a projection-target area in accordance with an example of an embodiment of the present invention.
Figure 14:
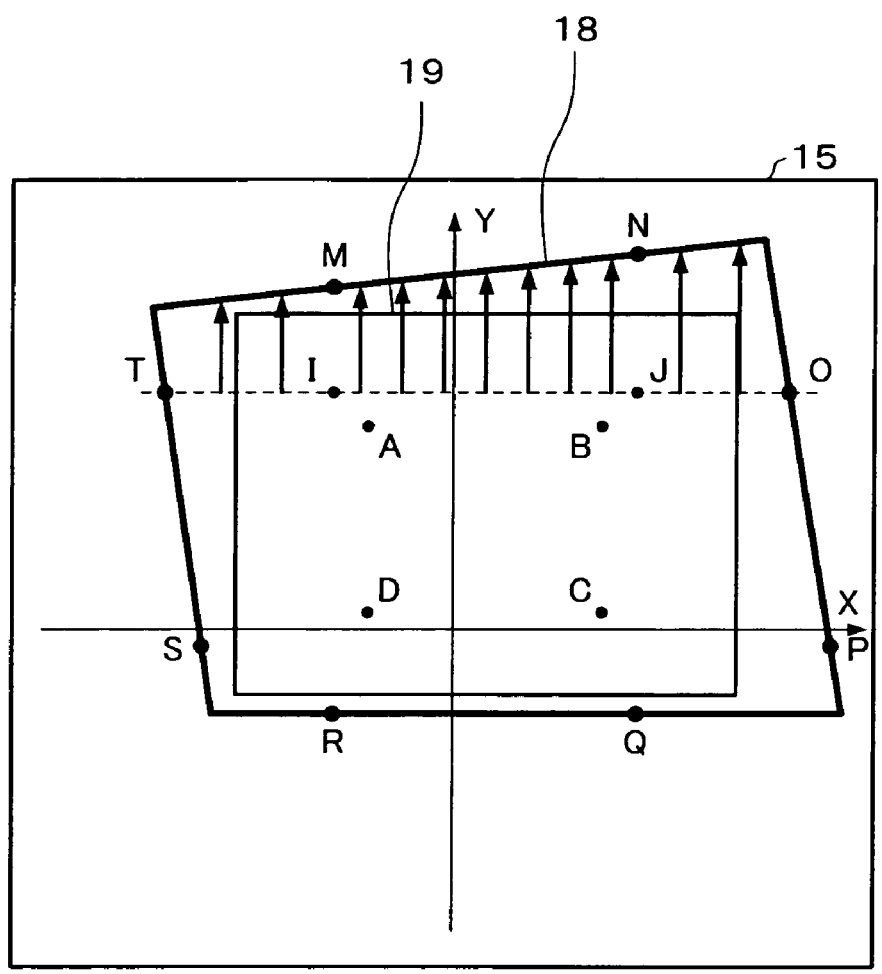
FIG. 14 is a conceptual view of a second step of a search method used during detection of a projection-target area in accordance with an example of an embodiment of the present invention.
Figure 15:
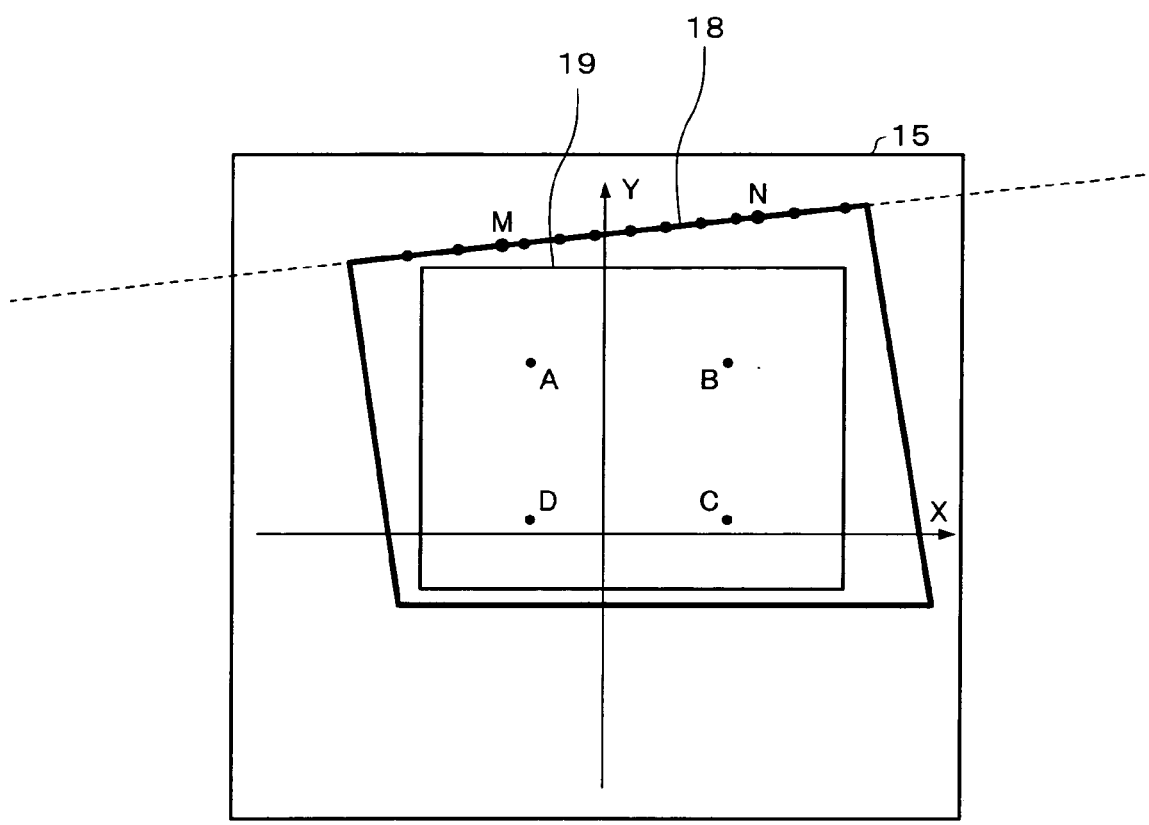
FIG. 15 is a conceptual view of a third step of a search method used during detection of a projection-target area in accordance with an example of an embodiment of the present invention.
Figure 16:
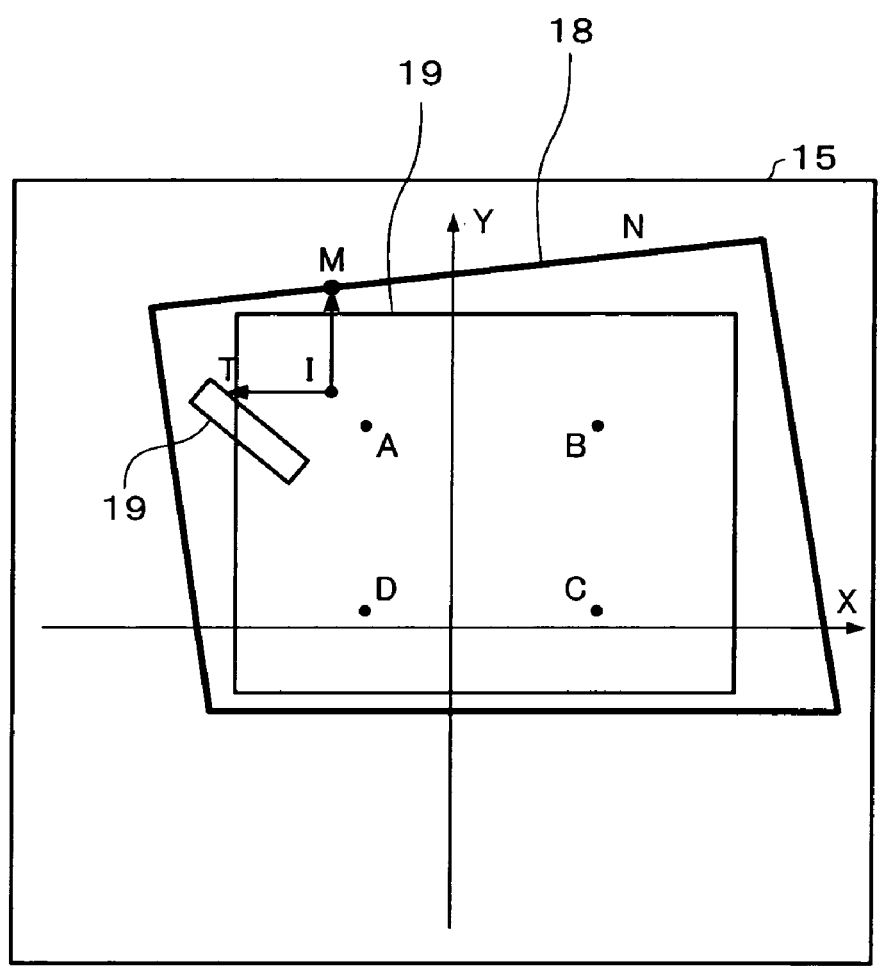
FIG. 16 is a conceptual view of edge detection point evaluation processing in accordance with an example of an embodiment of the present invention.

A conceptual view of a first step of a search method used during the detection of the projection-target area 18 in accordance with an example of this embodiment is shown in FIG. 13. A conceptual view of a second step of a search method used during the detection of the projection-target area 18 in accordance with an example of this embodiment is shown in FIG. 14. Similarly, a conceptual view of a third grayscale search method used during the detection of the projection-target area 18 in accordance with an example of this embodiment is shown in FIG. 15. Finally, a conceptual view of edge detection point evaluation processing in accordance with an example of this embodiment is shown in FIG. 16.

First of all, the search range determination section 182 sets four search support lines in the sensing area, as indicated by broken lines in FIG. 13, based on the first sensing information and the above-described coordinates information for the four corners ABCD of the center block area 16, to determining the candidates for edge detection (step S12). More specifically, the search range determination section 182 processes a white-colored sensed image that has been sensed at a low resolution, and sets search support lines that are p % further outward from the coordinates of the four corners ABCD of the center block area 16 detected by the center reference position detection section 154.

For example, the first search support line is given by y=round[{max(yA,yB)+(yA−yD)*p/100}*a], the second search support line is given by x=round[{max (xB,xC)+(xB−xA)*p/100}*a], the third search support line is given by y=round[{min (yC,yD)−(yA−yD)*p/100}*a], and the fourth search support line is given by x=round[{min(xA, xD)−(xB−xA)*p/100}*a]. Note that the terms "max," "min", "round", and "a" in this case are a function that returns the maximum value from among arguments, a function that returns the minimum value from among arguments, a function that returns an integer in which the first place after the decimal point is rounded off, and a coefficient for converting the resolution (high resolution) of the second sensed image into the resolution (low resolution) of the first sensed image. Note that "a" is not necessary is there is no need to convert the resolution.

By setting the four search support lines in this manner, it is possible to determine four intersections IJKL of the four search lines, as shown in FIG. 13.

The edge detection section 184 performs edge detection one pixel at a time, on the first sensed image along the search lines on the search support lines, towards the outer sides of the areas IJKL from the corresponding intersections IJKL (step S13). This enables the detection of eight edge detection points MNOPQRST, as shown in FIG. 13.

More specifically, the edge detection section 184 sets a plurality of edge detection points based on the sensing information of the first sensed image at the low resolution. The projection-target area information generation section 186 determines whether or not that plurality of edge detection points are within a predetermined pixel range (such as 3×3 pixels) around the boundary of the projection area 19, based on the positional information of the four corners of the projection image 12. If they are not within the predetermined pixel range, the projection-target area information generation section 186 uses the set plurality of edge detection points as is.

If they are within the predetermined pixel range, the projection-target area information generation section 186 further determines whether or not edges are detected at positions that are the same as the edge detection points detected based on the sensing information at the low resolution, by edge detection based on the sensing information of the second sensed image at the high resolution by the edge detection section 184. Note that since one pixel at the low resolution is equivalent to a plurality of pixels at the high resolution, the determination as to whether or not the position is the same is done within an area at the high resolution that is equivalent to one pixel at the low resolution.

If an edge is detected at the same position, the projection-target area information generation section 186 applies the edge detection point detected by the sensing information at high resolution.

If no edge is detected at the same position, the projection-target area information generation section 186 judges that the edge detection point detected at the low resolution is invalid, and the edge detection section 184 continues the edge detection by using the low-resolution sensing information and the high-resolution sensing information.

The above-described procedure enables the projection-target area information generation section 186 to generate provisional detection information that indicates an area surrounded by a plurality of edge detection points, as information indicating an area for the provisional detection of the projection-target area.

In addition, the edge detection section 184 performs edge detection in one-pixel increments in the direction of the boundary line of the projection-target area 18 from a line segment TO, the direction of the boundary line of the projection-target area 18 from a line segment NQ, the direction of the boundary line of the projection-target area 18 from a line segment PS, and the direction of the boundary line of the projection-target area 18 from a line segment RM.

In this case, the description concerns the example of edge detection in the direction of the boundary line of the projection-target area 18 from the line segment TO. The edge detection section 184 sets the range for edge detection from the line segment TO as seven search lines in a line segment IJ and two each in line segments TI and JO, parallel to the Y-axis and in the positive direction, as shown in FIG. 14. Note that the area in which the seven search lines are set is called the inner-side search area and the two areas in which two search lines are set are called the outer-side search areas.

The edge detection section 184 can therefore detect a maximum of eleven edge detection points (thirteen, including the points M and N) on the straight line MN, by performing edge detection one pixel at a time along these search lines. The edge detection section 184 performs similar edge detection for the other line segments NQ, PS, and RM.

Note that if the edge detection section 184 is unable to detect one point of a pair of edge detection points MN, OP, QR, and ST within the sensing area 15, it assumes that there is no boundary line for the projection-target area 18 in the outer-side search area and thus the setting of search lines and edge detection within that range are not done. If the edge detection section 184 is unable to detect both points of a pair of edge detection points MN, OP, QR, and ST within the sensing area 15, it assumes that there is no boundary line for the projection-target area 18 adjacent to and parallel to the line segment that cannot be detected, and thus the setting of search lines and edge detection within the inner-side search area and outer-side search areas are not done, for searching for the line segment that cannot be detected.

The execution of this processing enables the edge detection section 184 to omit edge detection in areas where the probability of the existence of the projection-target area 18 is low, making it possible to execute the processing faster.

As described above, this embodiment makes it possible for the edge detection section 184 to detect not the edges of the projection area 19 but the edges of the projection-target area 18 outside the projection area 19, even if the projection area 19 is within the projection-target area 18 or part of the boundary line of the projection area 19 overlaps part of the boundary line of the projection-target area 18, since the outer peripheral portion positioned around the boundary line of the screen 10 in the second calibration image is black, as shown in FIG. 13 and the like.

The projection-target area information generation section 186 determines the projection-target area 18 provisionally by setting a linear approximation straight line or linear approximation curve, such as that shown by the broken line in FIG. 15, based on the plurality of edge detection points detected by the edge detection section 184 (step S14).

The detection point evaluation section 188 also evaluates each edge detection point by determining whether or not each of the plurality of edge detection points detected by the edge detection section 184 is separated by at least a predetermined value from the linear approximation straight line or linear approximation curve set by the projection-target area information generation section 186 (step S15).

It could happen that illumination light 19 is comprised within the sensed image, as shown in FIG. 16, so that part of the illumination light is detected during the edge detection. If that should happen, the edge detection point T shown in FIG. 16 would be excluded from the processing performed by the projection-target area information generation section 186 because it would be separated by at least the predetermined value from the boundary line of the projection-target area 18.

In this manner, the projection-target area information generation section 186 detects the projection-target area 18 at a higher precision, by using only the edge detection points that are not excluded from the processing.

More specifically, the edge detection section 184 performs the edge detection on pixels peripheral to the edge detection points that have not been excluded from the processing, based on the third sensing information that is high-resolution sensing information (step S16). The edge detection section 184 outputs the edge detection information to the projection-target area information generation section 186.

The projection-target area information generation section 186 determines the projection-target area 18 by setting the linear approximation straight line or linear approximation curve again, based on that edge detection information (step S17). The projection-target area information generation section 186 generates projection-target area information indicating the positions of the four corners of the projection-target area 18.

Projection Image Adjustment Processing procedure

The description now turns to the adjustment processing procedure for the projection image 12.

Figure 17:
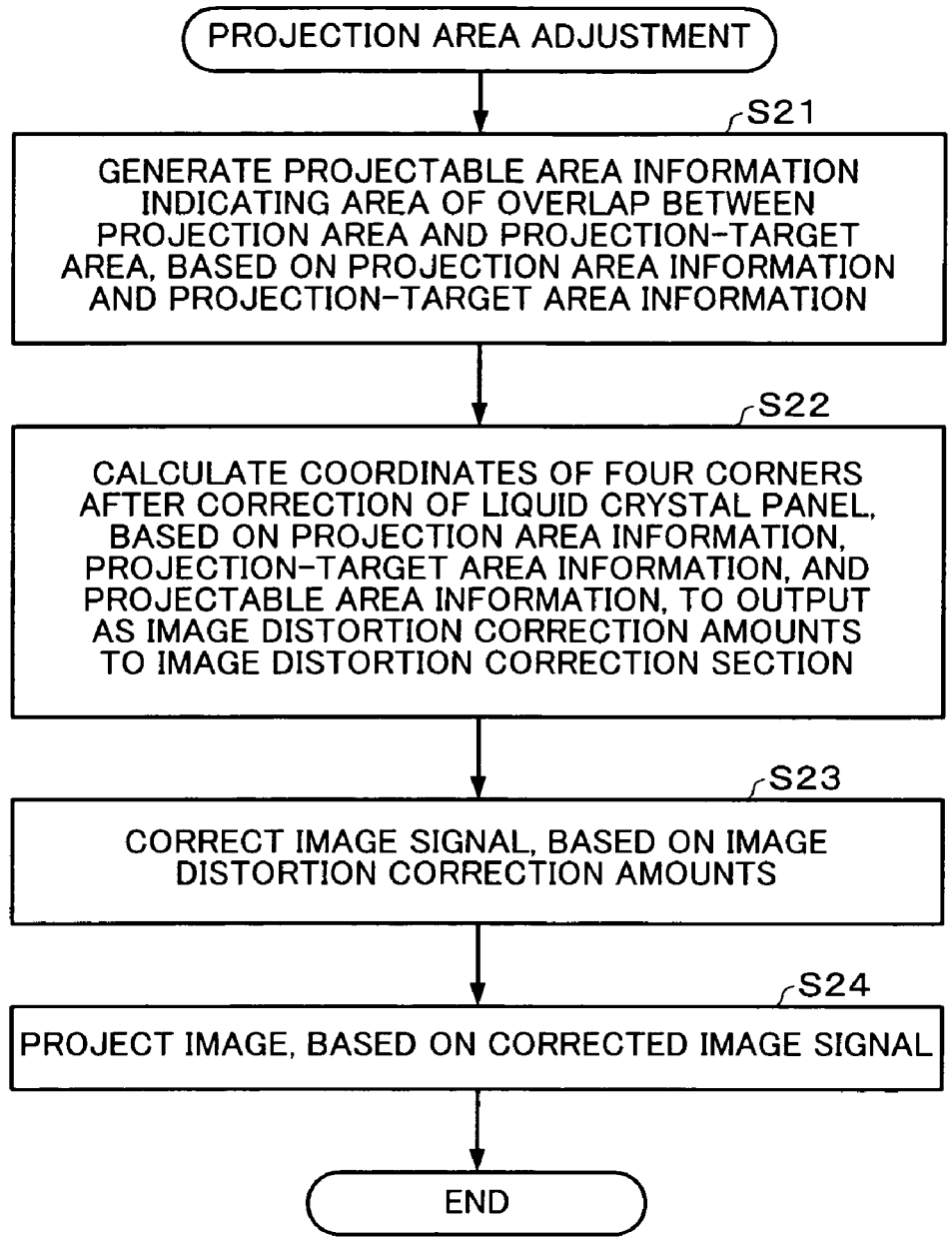
FIG. 17 is a flowchart of a projection image adjustment processing procedure in accordance with an example of an embodiment of the present invention.

A flowchart of the adjustment processing procedure for the projection image 12 in accordance with an example of this embodiment is shown in FIG. 17.

The projectable area information generation section 160 determines an area in which the projection area 19 and the projection-target area 18 overlap, as a projectable area, based on the projection area information from the projection area information generation section 158 and the projection-target area information from the projection-target area information generation section 186, and generates projectable area information indicating the coordinates of the four corners of that projectable area in the sensing area 15 (step S21).

The image distortion correction amount calculation section 162 calculates the coordinates of the four corners of the projection area 19 after correction for the liquid-crystal panel, based on the projection area information, the projection-target area information, and the projectable area information, in such a manner that the corrected image is comprised within the projectable area and also has a desired aspect ratio (ratio of vertical to horizontal) and is further displayed at the center of the screen 10, and outputs them as image distortion correction amounts to the image distortion correction section 112 (step S22).

The image distortion correction section 112 corrects the image signal (R1, G1, B1), based on those image distortion correction amounts (step S23).

The image projection section 190 projects an image based on the corrected image signal (step S24).

As described above, this embodiment enables the projector 20 to generate positional information of the projection-target area 18 in a shorter time and also more accurately, by detecting the projection-target area 18 based on the high-resolution sensing information around boundary lines of the projection-target area 18 that are detected provisionally based on the low-resolution sensing information. This enables the projector 20 to reduce the amount of calculations performed by the entire image processing system and thus execute image processing rapidly at a low load.

Since this embodiment also blackens the outer peripheral portion positioned around the boundary lines of the screen 10 in the second calibration image, it ensures that the projector 20 can detect the edges of the projection-target area 18 outside the projection area 19 and accurately generate positional information of the projection-target area 18, even if the projection area 19 is comprised within the projection-target area 18 or part of the boundary line of the projection area 19 overlaps part of the boundary line of the projection-target area 18.

This embodiment also enables the projector 20 to generate positional information of the projection-target area 18 within a shorter time, by performing edge detection in a state in which the areas subjected to the edge detection processing have been reduced.

The projector 20 can reduce the effects of noise and generate the positional information of the projection-target area 18 accurately, by excluding edge detection points that are separated from linear approximation straight lines or the like, from the processing. The projector 20 can also avoid erroneous detection of edges that could occur in the projection image 12 and thus perform more precise edge detection, by using a calibration image during the edge detection that does not comprise high-frequency components, such as an all-white image.

As described above, this embodiment enables the projector 20 correct the projection image 12 in a shorter time and also accurately, based on the positional relationship between the projection image 12 and the screen 10.

This embodiment further enables the projector 20 to correct distortion of the projection image 12 in such a manner that the corrected image is comprised within the projectable area and also has a desired aspect ratio (ratio of vertical to horizontal) and is further displayed at the center of the screen 10. This makes it possible for the projector to project an image that is easy for the users to see.

In addition to correcting distortion of the projection image 12 and adjusting the position thereof, the projector 20 can also perform suitable processing to detect a position that is indicated within the projection image 12 by a laser pointer or the like. The method of correction image distortion is not limited to that described above.

For example, the projector 20 could detect the pixel that has the greatest luminance value within the sensed image and base the correction of distortion of that image on the position of that pixel.

The projector 20 could also identify the four corners of the projection area 19 to a higher precision than that obtained by using a pattern image that has a feature only at the center, by using an image that has features at the periphery thereof in addition to the center, such as the pattern image shown in FIG. 5B.

For example, during the identification of the points P1 and P2 in FIG. 6, the projector 20 could also identify points at which the luminance value in the vicinity thereof changes. However, when an approximation straight line is set by using a plurality of points at such a narrow spacing, an error of one pixel in a point that is the origin of the approximation straight line can have a greater effect than in an approximation straight line formed by using a plurality of points at a wider spacing.

Since this embodiment enables the projector 20 to set approximation straight lines by using a plurality of points at wider spacing, by using the reference points of the center block area 16 and the reference points of the peripheral block area 17, it is possible to identify the four corners of the projection area 19 at a higher precision.

This makes it possible for the projector 20 to determine the position of the entire projection area 19 very precisely, avoiding the effects of shading of the projector 20 or the sensor 60.

In addition, this embodiment enables the projector 20 to detect the position of the projection area 19 more easily and also more rapidly, by searching only the necessary areas of the difference image, not the entire difference image.

The projector 20 can generate the first sensing information at an exposure suited to the usage environment by sensing the all-white image at a temporarily automatic exposure setting, to generate the first sensing information, during the projection of the calibration images. The projector 20 can also generate the second sensing information at an exposure suited to the generation of the difference image, by generating the second sensing information at the exposure used during the sensing of the all-white image.

In particular, by sensing an all-white image at the automatic exposure setting, the sensor 60 can utilize the dynamic range of the sensor 60 more effectively than in a method of sensing images at a fixed exposure, even when the screen 10 is affected by ambient light, when the reflection of the projected light is too weak because the projection distance is too great or the reflectivity of the screen 10 is too low, or when reflection of the projected light is too strong because the projection distance is too close or the reflectivity of the screen 10 is too high.

Modification

The description above concerned a preferred application of the present invention, but the present invention is not limited to the examples described above.

For example, when the first sensing information and the third sensing information are generated, the first sensing information and the third sensing information could be generated the first time by the sensor 60 sensing the first calibration image 13 at the high resolution then subjecting the high-resolution sensing information to image processing to convert it into low-resolution sensing information.

Concerning adjustment of the position or size of the projection image 12, an angle of view adjustment function (zoom function) of the projector 20 could be used. This would make it possible to reliably detect the projection-target area under darkroom conditions.

Figure 18:
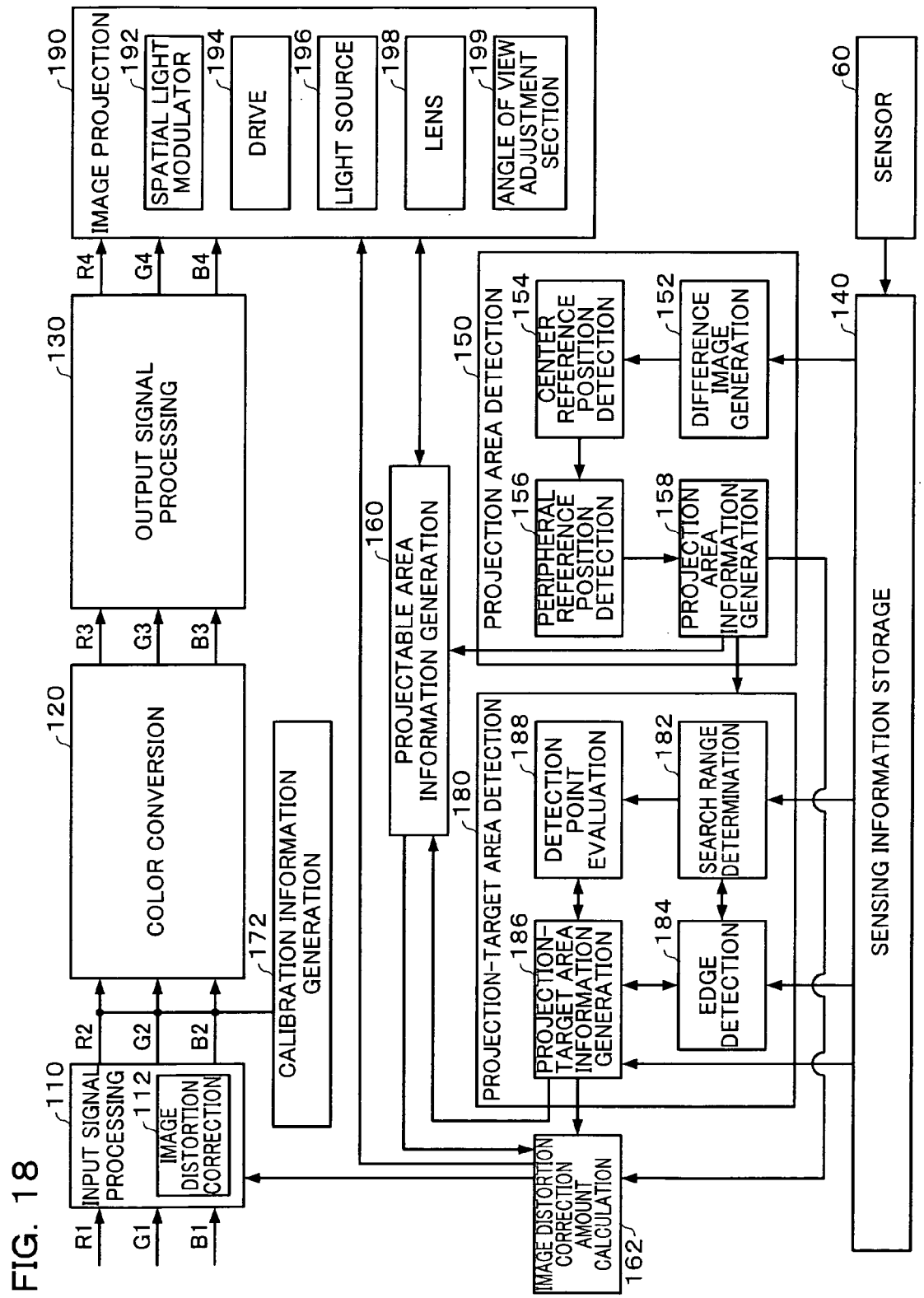
FIG. 18 is a functional block diagram of a projector in accordance with another example of an embodiment of the present invention.

A functional block diagram of the projector 20 in accordance with another example of this embodiment is shown in FIG. 18.

The configuration of FIG. 18 is provided with an angle of view adjustment section 199 in the image projection section 190 for adjusting the angle of view of the lens 198.

The angle of view adjustment section 199 is configured to adjust the angle of view of the lens 198, based on a correction amount for correcting the size of the image that is output by the image distortion correction amount calculation section 162.

More specifically, this correction amount could be a numerical value indicating an enlargement ratio or reduction ratio of the projection image 12, by way of example.

By configuring the projector 20 in such a manner that it can enlarge or reduce the projection image 12 in this manner, it is possible for the projector 20 to project the projection image 12 at the center of the screen 10 at a size that enables it to fit in the screen 10.

This enables the viewer of the image to view an image that is easier to see. It also increases the degree of freedom of placement of the projector 20, providing the user with a projector that can be used in more locations.

With such zoom control, the configuration could also be such that the angle of view adjustment section 199 is controlled in such a manner that the projectable area information generation section 160 sets a predetermined angle of view for projection of the calibration images and generates projectable area information that maximizes the projectable area during adjustment of an angle of view.

It is also desirable that this zoom control enables the image distortion correction amount calculation section 162 to calculate the correction amount for the angle of view adjustment section 199 that reduces the enlargement ratio to a necessary minimum limit, in such a manner that the effective number of pixels within the corrected image display range are made as many as possible, by way of example.

The search procedure can also be performed arbitrarily, so that the projector 20 could also search in the horizontal direction within the difference image to detect the center reference positions and peripheral reference positions, then search in the vertical direction based on those center reference positions and peripheral reference positions.

In addition to image distortion correction based on the projection area information, the projector 20 could also perform various different forms of processing that use positional information on the projection area 19, such as color non-uniformity correction within the projection area 19 or detection of a position indicated within the projection area 19, based on the projection area information.

The projector 20 could also detect the projection area 19 after detecting the projection-target area 18. It could be provided with a projection-target area boundary point detection section that detects a plurality of boundary points of the projection-target area 18 based on the first sensing information and the center reference positions, by way of example. The peripheral reference position detection section 156 could also be configured to detect the peripheral reference positions that are positioned closer to those boundary points than the center reference positions, based on the boundary points.

Note that the numbers of the center reference positions and the peripheral reference positions can be set arbitrarily and are not limited as in the above-described examples.

The patterns of the first calibration image 13 and the second calibration image 14 are also not limited to those shown in FIGS. 5A and 5B, but it is desirable that the shape of the center block area 16 is clear in at least the state in which the difference image is formed, and in particular the center block area 16 and the peripheral block area 17 are formed in the state in which the difference image is formed. For example, the configuration could be such that the first calibration image 13 comprises the center block area 16 and the second calibration image 14 comprises the peripheral block area 17.

In addition, the shapes of the calibration images and the center block area 16 are not limited to being rectangular; they could equally well be any shape other than rectangular, such as circular. Of course the overall shapes of the calibration images and the shape of the center block area 16 are not limited to being similar; the shapes thereof could be such as to identify the correspondence therebetween. Similarly, the shape of the peripheral block area 17 is arbitrary.

The present invention can also be applied to cases in which an image is projected onto a projection target such as a blackboard or whiteboard, other than the screen 10.

The embodiments described above related to examples in which an image processing system is mounted in the projector 20, but the image processing system could equally well be mounted in an image display device other than the projector 20, such as a cathode ray tube (CRT), A projector such as a digital micromirror device (DMD) could also be used as the projector 20, other than a liquid-crystal projector. Note that DMD is a trademark registered to Texas Instruments Inc. of the USA.

The functions of the above-described projector 20 could be implemented by the projector alone, by way of example, or they could be implemented by distributing them between a plurality of processing devices (such as between the projector and a PC).

In the above-described examples, the configuration was such that the sensor 60 was mounted within the projector 20, but the configuration could also be such that the sensor 60 and the projector 20 are separate independent devices.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. An image processing system which performs image processing based on a difference image, the difference image being a difference image between a first calibration image and a second calibration image and being configured of: a center block area positioned in a central part of the difference image; a peripheral block area positioned on a periphery of the center block area; and a background area which is an area other than the center block area and the peripheral block area, the image processing system comprising:

image projection means for projecting the first and second calibration images at different timings onto a projection target;

sensing means for sensing the projected first calibration image at a low resolution which is less than or equal to a predetermined resolution and generating first sensing information, sensing the first calibration image at a high resolution which is greater than or equal to the low resolution and generating third sensing information, and sensing the second calibration image at the high resolution and generating second sensing information;

projection area detection means for generating projection area information relating to a position of a projection area in a sensing area of the sensing means, based on the first and second sensing information;

projection-target area detection means for generating projection-target area information relating to a position of a projection-target area corresponding to the projection target in the sensing area of the sensing means, based on the first, second, and third sensing information; and image distortion correction means for correcting distortion of an image to be projected by the image projection means, based on the projection area information and the projection-target area information, wherein at least an outer peripheral portion of the second calibration image has a brightness index value of zero, wherein the projection area detection means comprises:
difference image generation means for generating the difference image, based on the first and second sensing information;
center reference position detection means for detecting a plurality of center reference positions of the center block area in the sensing area of the sensing means, based on the difference image;
peripheral reference position detection means for detecting a plurality of peripheral reference positions of the peripheral block area in the sensing area, based on the center reference positions; and
projection area information generation means for generating the projection area information, based on the center reference positions and the peripheral reference positions,
wherein the projection-target area detection means comprises:
search range determination means for setting a search range for edge detection in an outer portion of the center block area;
edge detection means for performing edge detection based on the first sensing information and the search range and generating first edge detection information, and also performing edge detection based on the third sensing information and generating third edge detection information; and
projection-target area information generation means for generating provisional detection information by provisionally detecting the projection-target area based on the first edge detection information, and also generating the projection-target area information based on the third edge detection information, and
wherein the edge detection means generates the third edge detection information by performing edge detection on a pixel group around a boundary of the provisionally detected projection-target area, based on the provisional detection information.

2. The image processing system as defined in claim 1,
wherein the edge detection means performs edge detection based on a second sensing information and generates second edge detection information; and
wherein when a first edge detection point based on the first edge detection information is not within a predetermined pixel range around a boundary of the projection area based on the projection area information, the projection-target area information generation means determines whether or not the first edge detection point matches a second edge detection point based on the second edge detection information, and generates the provisional detection information based on the second edge detection point when the determination result is true, or causes the edge detection means to detect again an edge for pixels which differ from the first and second edge detection points when the determination result is false.

3. The image processing system as defined in claim 1,
wherein the image distortion correction means comprises:
projectable area information generation means for generating projectable area information relating to a projectable area, based on the projection area information and the projection-target area information;
correction amount calculation means for calculating a correction amount for correcting at least one of a position, size, and distortion of an image to be projected by the image projection means, based on the projection area information, the projection-target area information, and the projectable area information; and
image signal correction means for correcting an image signal, based on the correction amount, and
wherein the image projection means projects an image based on the corrected image signal.

4. The image processing system as defined in claim 3,
wherein the image projection means comprises angle of view adjustment means for adjusting an angle of view of a projection lens, and
wherein the angle of view adjustment means adjusts the angle of view, based on a correction amount for correcting a size of the image which is output by the correction amount calculation means.

5. The image processing system as defined in claim 1,
wherein the edge detection means detects edges at a plurality of locations within a first sensed image based on the first sensing information, and generates the first edge detection information, and
wherein the projection-target area information generation means generates the provisional detection information by setting a linear approximation straight line or linear approximation curve, based on positional information of the plurality of locations based on the first edge detection information.

6. The image processing system as defined in claim 5,
wherein the projection-target area detection means comprises a detection point evaluation means for evaluating a plurality of edge detection points, and
wherein the detection point evaluation means determines whether or not each of the plurality of edge detection points is distanced from the linear approximation straight line or the linear approximation curve by at least a predetermined value, and controls the projection-target area information generation means in such a manner that a detection point which is distanced by at least the predetermined value is excluded and the linear approximation straight line or the linear approximation curve is reset.

7. The image processing system as defined in claim 1,
wherein the projection area information generation means generates the projection area information by setting a plurality of approximation straight lines or approximation curves based on the center reference positions and the peripheral reference positions and determining a shape or arrangement of the center block area and the peripheral block area.

8. The image processing system as defined in claim 7,
wherein the projection area and the center block area are rectangular areas, and
wherein the projection area information generation means determines positions of four corners of the center block area by detecting intersections of the plurality of approximation straight lines or intersections of the plurality of approximation curves, and generates the projection area information indicating the positions of four corners of the projection area, based on the positions of the four corners of the center block area.

9. The image processing system as defined in claim 1,
wherein the projection-target area detection means comprises a projection-target area boundary point detection means for detecting a plurality of boundary points of the projection-target area, based on the first sensing information and the center reference positions, and
wherein the peripheral reference position detection means detects the peripheral reference positions, based on the boundary points.

10. An image processing system which performs image processing based on a difference image, the difference image being a difference image between a first calibration image and a second calibration image and being configured of: a center block area positioned in a central part of the difference image; a peripheral block area positioned on a periphery of the center block area; and a background area which is an area other than the center block area and the peripheral block area, the image processing system comprising:

an image projection section which projects the first and second calibration images at different timings onto a projection target;

a sensing section which senses the projected first calibration image at a low resolution which is less than or equal to a predetermined resolution and generating first sensing information, sensing the first calibration image at a high resolution which is greater than or equal to the low resolution and generating third sensing information, and sensing the second calibration image at the high resolution and generating second sensing information;

a projection area detection section which generates projection area information relating to a position of a projection area in a sensing area of the sensing section, based on the first and second sensing information;

a projection-target area detection section which generates projection-target area information relating to a position of a projection-target area corresponding to the projection target in the sensing area of the sensing section, based on the first, second, and third sensing information; and an image distortion correction section which corrects distortion of an image to be projected by the image projection section, based on the projection area information and the projection-target area information, wherein at least an outer peripheral portion of the second calibration image has a brightness index value of zero, wherein the projection area detection section comprises:

a difference image generation section which generates the difference image, based on the first and second sensing information;

a center reference position detection section which detects a plurality of center reference positions of the center block area in the sensing area of the sensing section, based on the difference image;

a peripheral reference position detection section which detects a plurality of peripheral reference positions of the peripheral block area in the sensing area of the sensing section, based on the center reference positions; and a projection area information generation section which generates the projection area information, based on the center reference positions and the peripheral reference positions, wherein the projection-target area detection section comprises:

a search range determination section which sets a search range for edge detection in an outer portion of the center block area;

an edge detection section which performs edge detection based on the first sensing information and the search range and generating first edge detection information, and also performing edge detection based on the third sensing information and generating third edge detection information; and a projection-target area information generation section which generates provisional detection information by provisionally detecting the projection-target area based on the first edge detection information, and also generating the projection-target area information based on the third edge detection information, and wherein the edge detection section generates the third edge detection information by performing edge detection on a pixel group around a boundary of the provisionally detected projection-target area, based on the provisional detection information.

11. A projector which performs image processing based on a difference image, the difference image being a difference image between a first calibration image and a second calibration image and being configured of: a center block area positioned in a central part of the difference image; a peripheral block area positioned on a periphery of the center block area; and a background area which is an area other than the center block area and the peripheral block area, the projector comprising:

image projection means for projecting the first and second calibration images at different timings onto a projection target;

sensing means for sensing the projected first calibration image at a low resolution which is less than or equal to a predetermined resolution and generating first sensing information, sensing the first calibration image at a high resolution which is greater than or equal to the low resolution and generating third sensing information, and sensing the second calibration image at the high resolution and generating second sensing information;

projection area detection means for generating projection area information relating to a position of a projection area in a sensing area of the sensing means, based on the first and second sensing information;

projection-target area detection means for generating projection-target area information relating to a position of a projection-target area corresponding to the projection target in the sensing area of the sensing means, based on the first, second, and third sensing information; and image distortion correction means for correcting distortion of an image to be projected by the image projection means, based on the projection area information and the projection-target area information, wherein at least an outer peripheral portion of the second calibration image has a brightness index value of zero, wherein the projection area detection means comprises:

difference image generation means for generating the difference image, based on the first and second sensing information;

center reference position detection means for detecting a plurality of center reference positions of the center block area in the sensing area of the sensing means, based on the difference image;

peripheral reference position detection means for detecting a plurality of peripheral reference positions of the peripheral block area in the sensing area, based on the center reference positions; and projection area information generation means for generating the projection area information, based on the center reference positions and the peripheral reference positions, wherein the projection-target area detection means comprises:

search range determination means for setting a search range for edge detection in an outer portion of the center block area;

edge detection means for performing edge detection based on the first sensing information and the search range and generating first edge detection information, and also performing edge detection based on the third sensing information and generating third edge detection information; and projection-target area information generation means for generating provisional detection information by provisionally detecting the projection-target area based on the first edge detection information, and also generating the projection-target area information based on the third edge detection information, and wherein the edge detection means generates the third edge detection information by performing edge detection on a pixel group around a boundary of the provisionally detected projection-target area, based on the provisional detection information.

12. A projector which performs image processing based on a difference image, the difference image being a difference image between a first calibration image and a second calibration image and being configured of: a center block area positioned in a central part of the difference image; a peripheral block area positioned on a periphery of the center block area; and a background area which is an area other than the center block area and the peripheral block area, the projector comprising:

an image projection section which projects the first and second calibration images at different timings onto a projection target;

a sensing section which senses the projected first calibration image at a low resolution which is less than or equal to a predetermined resolution and generating first sensing information, sensing the first calibration image at a high resolution which is greater than or equal to the low resolution and generating third sensing information, and sensing the second calibration image at the high resolution and generating second sensing information;

a projection area detection section which generates projection area information relating to a position of a projection area in a sensing area of the sensing section, based on the first and second sensing information;

a projection-target area detection section which generates projection-target area information relating to a position of a projection-target area corresponding to the projection target in the sensing area of the sensing section, based on the first, second, and third sensing information; and an image distortion correction section which corrects distortion of an image to be projected by the image projection section, based on the projection area information and the projection-target area information, wherein at least an outer peripheral portion of the second calibration image has a brightness index value of zero, wherein the projection area detection section comprises:

a difference image generation section which generates the difference image, based on the first and second sensing information;

a center reference position detection section which detects a plurality of center reference positions of the center block area in the sensing area of the sensing section, based on the difference image;

a peripheral reference position detection section which detects a plurality of peripheral reference positions of the peripheral block area in the sensing area of the sensing section, based on the center reference positions; and a projection area information generation section which generates the projection area information, based on the center reference positions and the peripheral reference positions, wherein the projection-target area detection section comprises:

a search range determination section which sets a search range for edge detection in an outer portion of the center block area;

an edge detection section which performs edge detection based on the first sensing information and the search range and generating first edge detection information, and also performing edge detection based on the third sensing information and generating third edge detection information; and a projection-target area information generation section which generates provisional detection information by provisionally detecting the projection-target area based on the first edge detection information, and also generating the projection-target area information based on the third edge detection information, and wherein the edge detection section generates the third edge detection information by performing edge detection on a pixel group around a boundary of the provisionally detected projection-target area, based on the provisional detection information.

13. An information storage medium storing a computer readable program for causing a computer to function as an image processing system which performs image processing based on a difference image, the difference image being a difference image between a first calibration image and a second calibration image and being configured of: a center block area positioned in a central part of the difference image; a peripheral block area positioned on a periphery of the center block area; and a background area which is an area other than the center block area and the peripheral block area, the program for causing the computer to function as:

image projection means for projecting the first and second calibration images at different timings onto a projection target;

sensing means for sensing the projected first calibration image at a low resolution which is less than or equal to a predetermined resolution and generating first sensing information, sensing the first calibration image at a high resolution which is greater than or equal to the low resolution and generating third sensing information, and sensing the second calibration image at the high resolution and generating second sensing information;

projection area detection means for generating projection area information relating to a position of a projection area in a sensing area of the sensing means, based on the first and second sensing information;

projection-target area detection means for generating projection-target area information relating to a position of a projection-target area corresponding to the projection target in the sensing area of the sensing means, based on the first, second, and third sensing information; and image distortion correction means for correcting distortion of an image to be projected by the image projection means, based on the projection area information and the projection-target area information, wherein at least an outer peripheral portion of the second calibration image has a brightness index value of zero, wherein the projection area detection means comprises:

difference image generation means for generating the difference image, based on the first and second sensing information;

center reference position detection means for detecting a plurality of center reference positions of the center block area in the sensing area of the sensing means, based on the difference image;

peripheral reference position detection means for detecting a plurality of peripheral reference positions of the peripheral block area in the sensing area, based on the center reference positions; and projection area information generation means for generating the projection area information, based on the center reference positions and the peripheral reference positions, wherein the projection-target area detection means comprises:

search range determination means for setting a search range for edge detection in an outer portion of the center block area;

edge detection means for performing edge detection based on the first sensing information and the search range and generating first edge detection information, and also performing edge detection based on the third sensing information and generating third edge detection information; and projection-target area information generation means for generating provisional detection information by provisionally detecting the projection-target area based on the first edge detection information, and also generating the projection-target area information based on the third edge detection information, and wherein the edge detection means generates the third edge detection information by performing edge detection on a pixel group around a boundary of the provisionally detected projection-target area, based on the provisional detection information.

14. An image processing method for performing image processing based on a difference image, the difference image being a difference image between a first calibration image and a second calibration image and being configured of: a center block area positioned in a central part of the difference image; a peripheral block area positioned on a periphery of the center block area; and a background area which is an area other than the center block area and the peripheral block area, wherein at least an outer peripheral portion of the second calibration image has a brightness index value of zero, the image processing method comprising:

projecting the first calibration image towards a projection target;

sensing the projected first calibration image at a low resolution which is less than or equal to a predetermined resolution and generating first sensing information;

sensing the projected first calibration image at a high resolution which is greater than or equal to the low resolution and generating third sensing information;

projecting the second calibration image toward the projection target;

sensing the projected second calibration image at the high resolution and generating second sensing information;

generating the difference image based on the first and second sensing information;

detecting a plurality of center reference positions of the center block area in a sensing area, based on the difference image;

detecting a plurality of peripheral reference positions of the peripheral block area in the sensing area, based on the center reference positions;

generating projection area information relating to a position of a projection area within the sensing area, based on the center reference positions and the peripheral reference positions;

setting a search range for edge detection in an outer portion of the center block area;

performing edge detection based on the first sensing information and the search range, and generating first edge detection information;

provisionally detecting a projection-target area, based on the first edge detection information, and generating provisional detection information;

generating third edge detection information by performing edge detection on a pixel group around a boundary of the provisionally-detected projection-target area, based on the third sensing information and the provisional detection information;

generating projection-target area information relating to a position of the projection-target area in the sensing area, based on the third edge detection information; and correcting image distortion, based on the projection area information and the projection-target area information.

15. The image processing method as defined in claim 14, further comprising:

determining whether or not a first edge detection point based on the first edge detection information is within a predetermined pixel range around a boundary of the projection area based on the projection area information;

performing edge detection based on the second sensing information when the determination result is false, to generate second edge detection information;

determining whether or not the first edge detection point matches a second edge detection point, based on the second edge detection information; and generating the provisional detection information based on the second edge detection point when the determination result is true, or detecting again an edge for pixels which differ from the first and second edge detection points by the edge detection means when the determination result is false.

16. The image processing method as defined in claim 14, further comprising, during correcting distortion of the image:

generating projectable area information relating to a projectable area, based on the projection area information and the projection-target area information;

calculating a correction amount for correcting at least one of a position, size, and distortion of the image, based on the projection area information, the projection-target area information, and the projectable area information;

correcting an image signal, based on the correction amount; and projecting an image, based on the corrected image signal.

17. The image processing method as defined in claim 14, comprising:

adjusting an angle of view of a projection lens, based on a correction amount for correcting a size of the image.

18. The image processing method as defined in claim 14, comprising:

detecting edges at a plurality of locations within a first sensed image based on the first sensing information, and generating the first edge detection information; and generating the provisional detection information by setting a linear approximation straight line or linear approximation curve, based on positional information of the plurality of locations based on the first edge detection information.

19. The image processing method as defined in claim 18, comprising:
   determining whether or not each of a plurality of edge detection points is distanced from the linear approximation straight line or the linear approximation curve by at least a predetermined value; and
   excluding a detection point which is distanced by at least the predetermined value and resetting the linear approximation straight line or the linear approximation curve.

20. The image processing method as defined in claim 14, comprising:
   generating the projection area information by setting a plurality of approximation straight lines or approximation curves based on the center reference positions and the peripheral reference positions and determining a shape or arrangement of the center block area and the peripheral block area.

21. The image processing method as defined in claim 20, wherein the projection area and the center block area are rectangular areas,
   the image processing method comprising:
   determining positions of four corners of the center block area by detecting intersections of the plurality of approximation straight lines or intersections of the plurality of approximation curves, and generating the projection area information indicating the positions of four corners of the projection area, based on the positions of the four corners of the center block area.

22. The image processing method as defined in claim 14, comprising:
   detecting a plurality of boundary points of the projection-target area, based on the first sensing information and the center reference positions; and
   detecting the peripheral reference positions, based on the boundary points.

* * * * *